United States Patent
Nishiguchi et al.

(10) Patent No.: US 7,918,493 B2
(45) Date of Patent: Apr. 5, 2011

(54) IMPACT ENERGY ABSORBER AND FABRICATION METHOD THEREOF

(75) Inventors: Katsuya Nishiguchi, Higashi-Hiroshima (JP); Toshitsugu Ueoka, Hiroshima (JP); Kenichi Yamamoto, Hiroshima (JP); Kenji Murase, Hiroshima (JP)

(73) Assignee: Mazda Motor Corporation (JP)

( * ) Notice: Subject to any disclaimer, the term of this patent is extended or adjusted under 35 U.S.C. 154(b) by 6 days.

(21) Appl. No.: 12/537,040

(22) Filed: Aug. 6, 2009

(65) Prior Publication Data
US 2010/0032970 A1 Feb. 11, 2010

(30) Foreign Application Priority Data

Aug. 8, 2008 (JP) .................................. 2008-205197
Aug. 8, 2008 (JP) .................................. 2008-205202
Aug. 8, 2008 (JP) .................................. 2008-205204

(51) Int. Cl.
*B62D 25/08* (2006.01)
*B60R 19/34* (2006.01)

(52) U.S. Cl. ................... 296/187.09; 293/133; 293/155; 188/371

(58) Field of Classification Search ........... 296/187.03–187.12, 203.01–203.02, 296/193.09, 193.08; 293/133, 155; 188/371–377
See application file for complete search history.

(56) References Cited

U.S. PATENT DOCUMENTS

| 3,181,821 A * | 5/1965 | Webb ..................... 244/100 R |
| 3,308,908 A * | 3/1967 | Bunn ........................ 188/374 |
| 3,724,833 A * | 4/1973 | Sergay ....................... 267/140 |
| 2007/0251782 A1 | 11/2007 | Chen et al. |

* cited by examiner

*Primary Examiner* — Dennis H Pedder
(74) *Attorney, Agent, or Firm* — Studebaker & Brackett PC; Donald R. Studebaker

(57) ABSTRACT

A main body of an impact energy absorber is formed by integrally molding a deformable portion and a plurality of deformation controlling portions which are adapted to control the direction of plastic deformation of the deformable portion. The deformation controlling portions have such a configuration and shape that, when a compression load equal to or greater than a predetermined value is input to the main body in a tube axis direction, the deformable portion undergoes plastic deformation in at least one of a radially outward direction and a radially inward direction of the main body concurrently with the compressive plastic deformation in the tube axis direction.

15 Claims, 9 Drawing Sheets

IMPACT ENERGY ABSORBER AND FABRICATION METHOD THEREOF

CROSS-REFERENCE TO RELATED APPLICATIONS

This application claims priority from Japanese Patent Applications Nos. 2008-205197, 2008-205202, and 2008-205204 filed on Aug. 8, 2008, which are hereby incorporated by reference in its entirety for all purposes.

BACKGROUND

The technology disclosed in this specification relates to an impact energy absorber which absorbs a compression load input to a tubular main body in the tube axis direction and which is suitable for a crush can of a vehicle, and the like, and to a fabrication method of the impact energy absorber.

As conventionally known in the art, a vehicle is provided with a crush can as an impact energy absorber at, for example, the front end of the front side frame or the rear end of the rear side frame for absorbing impact energy (impact compression load) produced by a head-on or nose-to-tail collision of vehicles.

For impact energy absorbers, such as aforementioned crush cans, and the like, various improvements have been proposed to increase the impact energy absorbability. For example, the pamphlet of WO 2006/025559 describes that a tubular main body of an impact absorber is composed of at least one first portion having a short tubular shape and at least one second portion having a short tubular shape concentrically stacked on the first portion, wherein an engagement portion of the first portion and the second portion is inclined with respect to the concentric axis. When a compression load is input to the main body in the tube axis direction, the diameter of the first portion decreases while the diameter of the second portion increases so that the first portion is pushed into the inner hollow of the second portion. This structure serves to suppress occurrence of unstable buckling phenomenon so that deformation mode is stabilized, thereby improving the impact energy absorbability.

SUMMARY

However, in the above structure, there is a probability that, when a compression load is input to the main body in the tube axis direction so that the first portion and the second portion are disengaged at the engagement portion and the first portion is pushed into the inner hollow of the second portion, the first portion is not smoothly pushed into the inner hollow of the second portion, and the first portion or second portion undergoes buckling deformation. Therefore, it is difficult to stably deform the impact energy absorber. To surely prevent this buckling deformation, the lengths of the first and second portions need to be considerably short. In this case, a device which can absorb a compression load such as produced by collision of vehicles requires a considerably large number of first and second portions. Also, to smoothly push the first portion into the inner hollow of the second portion, the first portion and the second portion need to be only in contact with each other or, even if the first and second portions are fixed to each other, the fixing force need to be small. However, when the impact energy absorber has a considerably large number of first and second portions, there is a probability that the first or second portions fall off during transportation of the impact energy absorber or during assemblage of the absorber into a vehicle, or the like. Thus, the impact energy absorber disadvantageously has poor handleability.

The present invention was conceived under the above circumstances and may advantageously provide an impact energy absorber which can be stably deformed in the tube axis direction of the main body without causing buckling deformation in the tubular main body and which has excellent handleability.

The present invention may advantageously provide the first impact energy absorber example which has the following configuration. Specifically, the first impact energy absorber example includes a tubular main body for absorbing a compression load input to the main body in a tube axis direction. The main body includes a deformable portion which is composed of a metal and which is adapted to undergo compressive plastic deformation in the tube axis direction when the compression load is equal to or greater than a predetermined value, and a plurality of deformation controlling portions which are placed at a plurality of positions along the tube axis direction in an annular arrangement along a perimeter direction of the main body and which are adapted to control a direction of the plastic deformation of the deformable portion, the deformable portion and the deformation controlling portions being integrally molded. The deformation controlling portions have such a configuration and shape that, when the compression load input to the main body is equal to or greater than the predetermined value, the deformable portion undergoes plastic deformation in at least one of a radially outward direction and a radially inward direction of the main body concurrently with the compressive plastic deformation in the tube axis direction of the main body.

In the above-described structure, when a compressive load equal to or greater than the predetermined value is input to the main body in the tube axis direction, the deformation controlling portions assist the deformable portion to undergo plastic deformation in the radially outward and/or inward directions of the main body concurrently with compressive plastic deformation in the tube axis direction of the main body. Due to this plastic deformation of the deformable portion, the compression load (impact energy) can be absorbed. Also, the deformable portion deforms in such a fashion that the dimension in the tube axis direction of the main body decreases while the deformable portion extends in the radially outward and/or inward directions of the main body. Therefore, the entire main body stably deforms in the tube axis direction without causing buckling deformation. Further, since the deformable portion is integrally molded with the deformation controlling portions, the deformable portion is less susceptible to separation from the deformation controlling portions. This also ensures that the main body stably deforms in the tube axis direction. Therefore, even when a force which could push down the main body in a radial direction is input to the main body concurrently with the compression load input in the direction of tube axis, the main body is less susceptible to buckling deformation and surely deforms in the tube axis direction, so that the absorbability for the compression load can be improved. Even when the deformable portion and the deformation controlling portions are increased in number, the deformable portion and the deformation controlling portions can be firmly and readily combined together by integral molding. Thus, the handleability of the impact energy absorber during transportation or assemblage into a vehicle, or the like, can be improved.

Note that the deformation controlling portions may be formed of a material which is less susceptible to compressive plastic deformation and fracture than the deformable portion under a compression load input in the tube axis direction, i.e., a material having a higher strength and a higher rigidity against the compression load than the deformable portion.

In the above-described impact energy absorber, preferably, the deformable portion and the deformation controlling portions may be alternately stacked in the tube axis direction of the main body, and a surface of each of the deformation controlling portions which is in contact with the deformable portion may be a slope surface which extends in the radially outward direction of the main body with an inclination to one side or the other side with respect to the tube axis direction of the main body.

Thus, due to the slope surfaces of the respective deformation controlling portions, the deformable portion can readily undergo plastic deformation in the radially outward and/or inward directions of the main body concurrently with the compressive plastic deformation in the tube axis direction of the main body.

Preferably, any two of the slope surfaces which are adjacent in the tube axis direction of the main body may extend in the radially outward direction of the main body with an inclination to opposite sides.

Due to this feature, the deformable portion can more surely undergo plastic deformation in the radially outward or inward directions of the main body concurrently with the compressive plastic deformation in the tube axis direction of the main body. In the case where there are a plurality of deformable portions, all the deformable portions can undergo plastic deformation to the same side with respect to the radial direction of the main body.

In this case, the slope surfaces may preferably be inclined such that, when the compression load input to the main body is equal to or greater than the predetermined value, the deformable portions undergo plastic deformation in the radially inward direction of the main body concurrently with the compressive plastic deformation in the tube axis direction of the main body.

Due to this feature, the amount of absorbed compression load can be further increased because the deformation resistance against plastic deformation of the deformable portions in the radially inward directions of the main body is larger than the deformation resistance against plastic deformation in the radially outward directions of the main body.

In the above-described impact energy absorber, preferably, the deformable portion may be composed of an aluminum alloy casting, and the deformation controlling portions may be composed of an aluminum alloy casting which contains reinforcement fiber.

Due to this feature, the deformation controlling portions are less susceptible to compressive plastic deformation and fracture than the deformable portion thanks to the reinforcement fiber, so that the direction of the plastic deformation of the deformable portion can surely be controlled. Also, the weight of the impact energy absorber can be reduced. The deformable portion and the deformation controlling portions can readily be integrally molded by preparing premolded bodies of reinforcement fiber molded bodies and combining the premolded bodies and molten aluminum alloy.

Preferably, the aluminum alloy casting may be an Al—Mn—Fe—Mg alloy casting.

Specifically, by appropriately setting the contents of respective elements, the Al—Mn—Fe—Mg alloy enjoys both improved castability and elongation while maintaining the strength of the aluminum alloy. As a result, a high ductility material which exhibits high elongation can be obtained even if it is only casted. Therefore, the absorbability for the compression load can be improved while the weight of the impact energy absorber is reduced.

Preferably, the impact energy absorber may be used for a front side frame or a crush can of a vehicle.

Thus, the impact energy which is produced by a head-on or nose-to-tail collision of vehicles is surely absorbed so that the safety of the vehicles can be improved. When the deformable portion is composed of an aluminum alloy casting and the deformation controlling portions are composed of an aluminum alloy casting which contains reinforcement fiber, the safety of the vehicle can be improved while the weight of the vehicle is reduced.

When any two of the slope surfaces which are adjacent in the tube axis direction of the main body extend in the radially outward direction of the main body with an inclination to opposite sides, a shear deformation enhancing layer may preferably be provided at a border between the slope surface and the deformable portion for enhancing shear deformation of an end part of the deformable portion near the border relative to the slope surface when the compression load input to the main body is equal to or greater than the predetermined value.

Due to the above-described shear deformation enhancing layer, the deformable portion more readily undergoes plastic deformation in the radially outward or inward directions of the main body. Specifically, when the compression load input to the main body is equal to or greater than the predetermined value, shear force acts at or near the borders between the slope surfaces and the deformable portion due to the inclination of the slope surfaces such that the end parts of the deformable portion near the borders are shifted in the radially outward or inward directions of the main body along the slope surfaces. When the shear deformation enhancing layer is composed of a material which can cause the end parts of the deformable portion near the borders to more readily undergo shear deformation relative to the slope surfaces, the end parts of the deformable portion near the borders undergo shear deformation relative to the slope surfaces, so that the deformable portion can more readily undergo plastic deformation in the radially outward or inward directions of the main body.

In the case where the shear deformation enhancing layers are provided at the borders between the slope surfaces and the deformable portion, the slope surfaces may preferably be inclined such that, when the compression load input to the main body is equal to or greater than the predetermined value, the deformable portion undergoes plastic deformation in the radially inward direction of the main body concurrently with the compressive plastic deformation in the tube axis direction of the main body.

Due to this feature, the amount of absorbed compression load can be further increased because the deformation resistance against plastic deformation of the deformable portion in the radially inward directions of the main body is larger than the deformation resistance against plastic deformation in the radially outward directions of the main body.

The shear deformation enhancing layer may be composed of an alloy which contains the metal and which has a lower melting point than the metal.

Specifically, an alloy which contains the metal used for the deformable portion and which has a lower melting point than the metal of the deformable portion (for example, a Zn—Al alloy when the metal is an aluminum alloy) generally has a low strength. Therefore, due to the shear force which occurs when the compression load input to the main body is equal to or greater than the predetermined value, the end parts of the deformable portion near the borders readily undergo shear deformation relative to the slope surfaces. In fabrication of the impact energy absorber, the deformation controlling portion formation members for forming the plurality of deformation controlling portions are prepared in advance, and the molten material of the metal used for the deformable portion is supplied into a cavity of a mold with the deformation controlling portion formation members being set in the cavity of the mold. Therefore, in integral molding of the deformable portion and the deformation controlling portions, when end parts of the deformation controlling portion formation members corresponding to the slope surfaces are composed of a plating material which has a lower melting point than the metal, a shear deformation enhancing layer can readily be formed of an alloy which contains the metal used for the deformable portion and which has a lower melting point than the metal at the borders between the slope surfaces and the deformable portion.

When the shear deformation enhancing layers are provided at the borders between the slope surfaces and the deformable portion, the deformable portion may preferably be composed of an aluminum alloy casting, the deformation controlling portions and the shear deformation enhancing layer may preferably be composed of an aluminum alloy casting which contains reinforcement fiber, and a reinforcement fiber volume fraction in the shear deformation enhancing layer may preferably be larger than that in the deformation controlling portions.

Due to this feature, the deformation controlling portions are less susceptible to compressive plastic deformation and fracture than the deformable portion thanks to the reinforcement fiber, so that the direction of the plastic deformation of the deformable portion can surely be controlled. Also, the weight of the impact energy absorber can be reduced. The deformable portion and the deformation controlling portions can readily be integrally molded by preparing premolded bodies of reinforcement fiber molded bodies as the deformation controlling portion formation members and combining the premolded bodies and molten aluminum alloy. Here, when the reinforcement fiber volume fraction of the end parts of the premolded bodies corresponding to the slope surfaces is greater than the other part of the premolded bodies, the part of the premolded bodies which has the greater reinforcement fiber volume fraction constitutes the shear deformation enhancing layer while the other part of the premolded bodies which has the smaller reinforcement fiber volume fraction constitutes the deformation controlling portions. When the shear deformation enhancing layer has the greater reinforcement fiber volume fraction, the content of the metal (aluminum alloy) is small at the borders between the slope surfaces and the deformable portion (shear deformation enhancing layer). Also, the reinforcement fiber is oriented so as to extend generally along the slope surfaces. Thus, interposition of the shear deformation enhancing layers leads to decrease in bonding strength between the deformable portion and the deformation controlling portions against the shear force. As a result, the end parts of the deformable portion near the borders can readily undergo shear deformation relative to the slope surfaces.

When the shear deformation enhancing layers are provided at the borders between the slope surfaces and the deformable portion, the deformable portion may be composed of an aluminum alloy casting, the deformation controlling portions may be composed of steel members, and the shear deformation enhancing layers may be composed of an Al—Fe intermetallic compound.

The Al—Fe intermetallic compound has low strength and is brittle. Therefore, due to the shear force which occurs when the compression load input to the main body is equal to or greater than the predetermined value, the end parts of the deformable portion near the borders readily undergo shear deformation relative to the slope surfaces. Further, the deformable portion and the deformation controlling portions are integrally molded by supplying the molten material of the metal used for the deformable portion (aluminum alloy) into a cavity of a mold with the above-described deformation controlling portion formation members (of steel) being set in the cavity, and then, the resultant structure is subjected to an appropriate thermal treatment, whereby shear deformation enhancing layers can readily be formed of an Al—Fe intermetallic compound at the borders between the slope surfaces and the deformable portion.

The aluminum alloy casting may preferably be an Al—Mn—Fe—Mg alloy casting.

Due to this feature, the absorbability for the compression load can be improved while the weight of the impact energy absorber is reduced.

When the shear deformation enhancing layers are provided at the borders between the slope surfaces and the deformable portion, the impact energy absorber may preferably be used for a front side frame or a crush can of a vehicle.

Therefore, the safety of the vehicle can be improved while the weight of the vehicle is reduced.

The second impact energy absorber example may be configured as follows. Specifically, the second impact energy absorber example includes a tubular main body for absorbing a compression load input to the main body in a tube axis direction, wherein the main body includes a deformable portion which is composed of a metal and which is adapted to undergo compressive plastic deformation in the tube axis direction when the compression load is equal to or greater than a predetermined value, a plurality of outer deformation controlling portions which are placed in an outer perimeter surface of the main body at a plurality of positions along the tube axis direction in an annular arrangement along a perimeter direction of the main body and which are adapted to control a direction of the plastic deformation of the deformable portion, and a plurality of inner deformation controlling portions which are placed in an inner perimeter surface of the main body at a plurality of positions along the tube axis direction in an annular arrangement along a perimeter direction of the main body and which are adapted to control the direction of the plastic deformation of the deformable portion, the deformable portion and the outer and inner deformation controlling portions being integrally molded. The outer and inner deformation controlling portions are alternately provided in the tube axis direction of the main body such that, when the compression load input to the main body is equal to or greater than the predetermined value, part of the deformable portion which is provided in the outer perimeter surface of the main body undergoes plastic deformation in a radially outward direction of the main body while part of the deformable portion which is provided in the inner perimeter surface of the main body undergoes plastic deformation in a radially inward direction of the main body concurrently with the compressive plastic deformation of the deformable portion in the tube axis direction of the main body.

In the above-described structure, when a compressive load equal to or greater than the predetermined value is input to the main body in the tube axis direction, the outer and inner deformation controlling portions assist the deformable portion to undergo plastic deformation in the radially outward and inward directions of the main body concurrently with compressive plastic deformation in the tube axis direction of the main body. Due to this plastic deformation of the deformable portion, the compression load (impact energy) can be absorbed. Also, the deformable portion deforms in such a fashion that the dimension in the tube axis direction of the main body decreases while the deformable portion extends in the radially outward and inward directions of the main body in a well balanced manner. Therefore, the entire main body stably deforms in the tube axis direction without causing buckling deformation. Further, since the deformable portion is integrally molded with the outer and inner deformation controlling portions, the deformable portion is less susceptible to separation from the outer and inner deformation controlling portions. This also ensures that the main body stably deforms in the tube axis direction. Therefore, even when a force which could push down the main body in a radial direction is input to the main body concurrently with the compression load input in the direction of tube axis, the main body is less susceptible to buckling deformation and surely deforms in the tube axis direction, so that the absorbability for the compression load can be improved. Even when the outer and inner deformation controlling portions are increased in number, the outer and inner deformation controlling portions can be firmly and readily combined with the deformable portion by integral molding. Thus, the handleability of the impact energy absorber during transportation or assemblage into a vehicle, or the like, can be improved.

Note that the outer and inner deformation controlling portions may be formed of, for example, a material which is less susceptible to compressive plastic deformation and fracture than the deformable portion under a compression load input in the tube axis direction, i.e., a material having a higher strength and a higher rigidity against the compression load than the deformable portion.

In the second impact energy absorber example, the deformable portion may preferably be composed of an aluminum alloy casting, and the outer and inner deformation controlling portions may preferably be composed of an aluminum alloy casting which contains reinforcement fiber.

Due to these features, the outer and inner deformation controlling portions are less susceptible to compressive plastic deformation and fracture than the deformable portion thanks to the reinforcement fiber, so that the direction of the plastic deformation of the deformable portion can surely be controlled. Also, the weight of the impact energy absorber can be reduced. The deformable portion and the outer and inner deformation controlling portions can readily be integrally molded by preparing outer and inner premolded bodies of reinforcement fiber molded bodies and combining the outer and inner premolded bodies and molten aluminum alloy.

The reinforcement fiber may preferably extend in a radial direction of the main body.

Due to this feature, when a compression load having a magnitude which can cause the outer and inner deformation controlling portions to undergo compressive plastic deformation is input to the main body in the tube axis direction, the outer and inner deformation controlling portions also undergo compressive plastic deformation straight in the tube axis direction. Therefore, buckling deformation of the main body can be more surely prevented.

The aluminum alloy casting may preferably be an Al—Mn—Fe—Mg alloy casting.

Due to this feature, the absorbability for the compression load can be improved while the weight of the impact energy absorber is reduced.

The second impact energy absorber example may preferably be used for a front side frame or a crush can of a vehicle.

Therefore, the safety of the vehicle can be improved while the weight of the vehicle is reduced.

A method for fabricating the first impact energy absorber example preferably includes molding a plurality of premolded bodies from which the plurality of deformation controlling portions can be formed by combination with a molten material of the metal, and integrally molding the deformable portion and the deformation controlling portions by supplying the molten material of the metal into a cavity of a mold with the premolded bodies being set in the cavity to combine the molten material and the premolded bodies into a composite.

By combining the premolded bodies and the molten material of the metal into a composite using this fabrication method, the deformable portion and the deformation controlling portions can readily be integrally molded. The first impact energy absorber example which is capable of stable deformation in the tube axis direction of the main body and which has excellent handleability can readily be produced.

In the fabrication method of the first impact energy absorber example, preferably, the deformable portion and the deformation controlling portions may be alternately stacked in the tube axis direction of the main body, and a surface of each of the deformation controlling portions which is in contact with the deformable portion may be a slope surface which extends in the radially outward direction of the main body with an inclination to one side or the other side with respect to the tube axis direction of the main body.

In the fabrication method of the first impact energy absorber example, preferably, the metal may be an aluminum alloy, and the premolded bodies may be composed of reinforcement fiber molded bodies.

A method for fabricating the second impact energy absorber example preferably includes molding a plurality of outer premolded bodies and a plurality of inner premolded bodies from which the plurality of outer deformation controlling portions and the plurality of inner deformation controlling portions can be formed by combination with a molten material of the metal; and integrally molding the deformable portion and the outer and inner deformation controlling portions by supplying the molten material of the metal into a cavity of a mold with the outer and inner premolded bodies being set in the cavity to combine the molten material and the outer and inner premolded bodies into a composite.

By combining the outer and inner premolded bodies and the molten material of the metal into a composite using this fabrication method, the deformable portion and the outer and inner deformation controlling portions can readily be integrally molded. An impact energy absorber which is capable of stable deformation in the tube axis direction of the main body and which has excellent handleability can be readily produced.

In the fabrication method of the second impact energy absorber example, preferably, the metal may be an aluminum alloy, and the outer and inner premolded bodies may be composed of reinforcement fiber molded bodies.

DETAILED DESCRIPTION

Hereinafter, example embodiments are described with reference to the drawings. Note that the following description of the example embodiments is essentially exemplary and does not intend to limit the present invention or its applications and uses.

Example Embodiment 1

Figure 1:
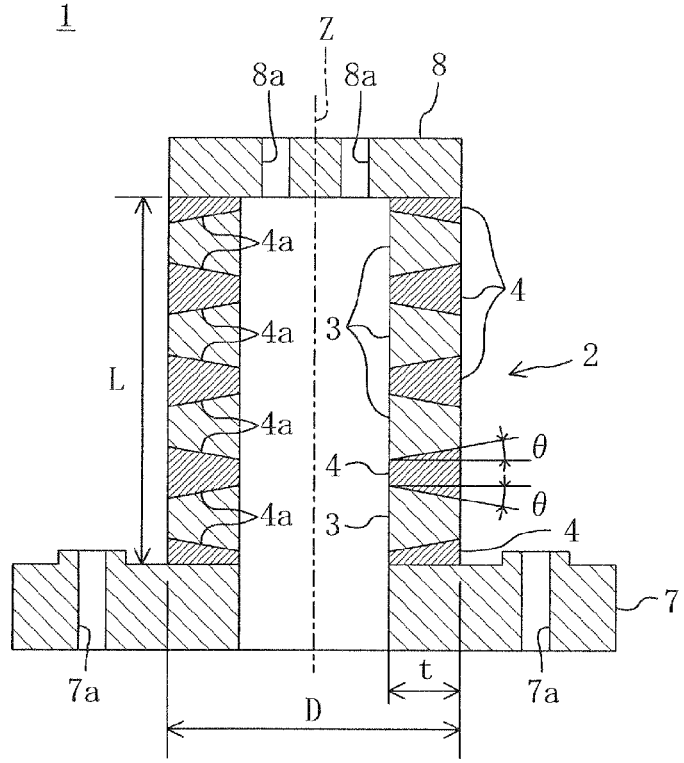
FIG. 1 is a cross-sectional view showing an impact energy absorber according to example embodiment 1.

FIG. 1 shows an impact energy absorber 1 of example embodiment 1. The impact energy absorber 1 has a main body 2 which is tubular (specifically, cylindrical in this example embodiment) and which is adapted to absorb a compression load input to the main body 2 in the direction of tube axis Z (vertically downward direction in FIG. 1).

Figure 2:
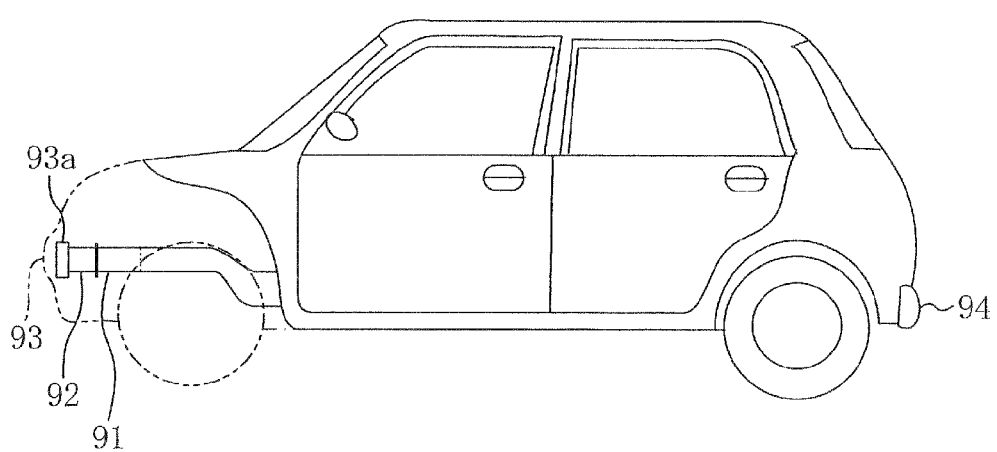
FIG. 2 is a side view of a vehicle, the front portion of which is cut-away to show a crush can to which an impact energy absorber is applied.

In this example embodiment, as shown in FIG. 2, at both sides of the front part of a vehicle 100 with respect to the vehicle width direction, the impact energy absorber 1 is used as crush cans 92 which are interposed between the front ends of right and left front side frames 91 extending in the lengthwise direction of the vehicle 100 and the right and left ends of a bumper reinforcement 93a extending in the vehicle width direction in a front bumper 93. In this case, the impact energy absorber 1 is placed such that the direction of tube axis Z is coincident with the lengthwise direction of the vehicle 100. In the case of a head-on collision of the vehicle 100, the impact energy absorber 1 absorbs impact energy input from the bumper reinforcement 93a (impact compression load). Also in example embodiments 2-7 which will be described later, impact energy absorbers used as the crush cans 92 will be described.

Note that the impact energy absorber 1 is not limited to the crush can 92. The impact energy absorber 1 may be used as part of the right and left front side frames 91 (especially, front ends), as part of unshown right and left rear side frames extending in the lengthwise direction along both sides with respect to the vehicle width direction in the rear part of the vehicle 100 (especially, rear ends), or as crush cans (not shown) interposed between the rear ends of the rear side frames and a bumper reinforcement (not shown) of a rear bumper 94. The impact energy absorber 1 is widely applicable to a region of the vehicle 100 in which impact energy need to be absorbed and is also applicable to a device other than the vehicle 100.

At both axial ends with respect to the direction of tube axis Z of the main body 2, the main body 2 includes first and second fixing portions 7 and 8 for fixedly securing the impact energy absorber 1 to the front ends of the front side frames 91 and to the bumper reinforcement 93a. The first fixing portion 7 has a plurality of bolt insertion holes 7a through which bolts are to be screwed to fixedly secure the first fixing portion 7 to the front end of the front side frame 91. The second fixing portion 8 has a plurality of bolt insertion holes 8a through which bolts are to be screwed to fixedly secure the second fixing portion 8 to the bumper reinforcement 93a. The shapes of the first fixing portion 7 and the second fixing portion 8 can vary according to the location in the vehicle to which the impact energy absorber 1 is applied.

When the impact energy absorber 1 is used as the crush cans 92 as in this example embodiment, the outside diameter D of the main body 2 is preferably 40-100 mm, the thickness t is preferably 2-8 mm, and the length L is preferably 80-150 mm. Note that the outside diameter D of the main body 2 is shown to be uniform over the entirety of the main body 2 in the direction of tube axis Z in FIG. 1, but actually is not uniform so that the outside diameter D gradually decreases toward the second fixing portion 8. This is to facilitate separation of the impact energy absorber 1 from a casting mold 30 (described later with reference to FIG. 8) after the casting.

The main body 2 is integrally composed of a plurality of deformable portions 3 (herein, four deformable portions 3) which undergo compressive plastic deformation in the direction of tube axis Z when a compression load equal to or greater than a predetermined value is input to the main body 2 in the direction of tube axis Z, and a plurality of deformation controlling portions 4 (herein, five deformation controlling portions 4) which are placed at a plurality of positions along the direction of tube axis Z in an annular arrangement along a perimeter direction of the main body 2 and which are adapted to control the direction of the plastic deformation of the deformable portions 3. The deformation controlling portions 4 may be formed of a material which is less susceptible to compressive plastic deformation and fracture than the deformable portions 3 under a compression load input in the direction of tube axis Z, i.e., a material having a higher strength and a higher rigidity against the compression load than the deformable portions 3. However, the present invention is not limited to such a material. Specific material examples available in this example embodiment will be described later.

The configuration and shape of the deformation controlling portions 4 are such that, when the compression load input to the main body 2 is equal to or greater than the predetermined value, the deformable portions 3 are forced to undergo plastic deformation in the radially inward directions of the main body 2 (diameter-decreasing deformation) concurrently with compressive plastic deformation in the direction of tube axis Z.

Specifically, the plurality of annular deformable portions 3 and the plurality of annular deformation controlling portions 4 are alternately stacked in the direction of tube axis Z of the main body 2. Surfaces of the deformation controlling portions 4 which are in contact with the deformable portions 3 are slope surfaces 4a which extend in the radially outward directions of the main body 2 with an inclination to one side or the other side with respect to the direction of tube axis Z. Any two slope surfaces 4a which are adjacent in the direction of tube axis Z extend in the radially outward directions of the main body 2 with an inclination to opposite sides with respect to the direction of tube axis Z. In this example embodiment, the respective slope surfaces 4a are inclined such that, when a compression load equal to or greater than the predetermined value is input to the main body 2 in the direction of tube axis Z, all the deformable portions 3 undergo plastic deformation in the radially inward directions of the main body 2 concurrently with compressive plastic deformation in the direction of tube axis Z. Specifically, the dimension of each of the deformation controlling portions 4 in the direction of tube axis Z increases along the radially outward directions of the main body 2 while the dimension of each of the deformable portions 3 in the direction of tube axis Z decreases along the radially outward directions of the main body 2.

Note that the respective slope surfaces 4a may be inclined such that, when a compression load equal to or greater than the predetermined value is input to the main body 2 in the direction of tube axis Z, all the deformable portions 3 undergo plastic deformation in the radially outward directions of the main body 2 (diameter-increasing deformation) concurrently with compressive plastic deformation in the direction of tube axis Z. Specifically, the dimension of each of the deformation controlling portions 4 in the direction of tube axis Z decreases along the radially outward directions of the main body 2 while the dimension of each of the deformable portions 3 in the direction of tube axis Z increases along the radially outward directions of the main body 2. Note that the deformation resistance against plastic deformation of the deformable portions 3 in the radially inward directions of the main body 2 is larger than the deformation resistance against plastic deformation in the radially outward directions. Therefore, in view of increasing the amount of absorbed compression load, plastic deformation of the deformable portions 3 in the radially inward directions of the main body 2 is preferable.

The inclination angle θ of each slope surface 4a (the inclination angle relative to a plane perpendicular to the direction of tube axis Z) is preferably 30° to 60°, and more preferably 40° to 50°. Some of the slope surfaces 4a which extend in the radially outward directions of the main body 2 with an inclination to one side with respect to the direction of tube axis Z and the other slope surfaces 4a which extend in the radially outward directions of the main body 2 with an inclination to the other side with respect to the direction of tube axis Z preferably have the same inclination angle but may have different inclination angles.

In this example embodiment, the both axial ends of the main body 2 with respect to the direction of tube axis Z are formed by the deformation controlling portions 4. However, they may alternatively be formed by the deformable portions 3. Only one of the both axial ends may be formed by the deformation controlling portion 4. The number of the deformable portions 3 may be one. In this case, the both axial ends of the main body 2 with respect to the direction of tube axis Z are formed by the deformation controlling portions 4.

The plurality of deformable portions 3 preferably have generally the same shape and dimensions. This is to prevent a compression load from being excessively exerted on specific ones of the deformable portions 3, such that the compression load is uniformly exerted on all the deformable portions 3.

In this example embodiment, the deformable portions 3 are composed of an aluminum alloy casting, and the deformation controlling portions 4 are composed of an aluminum alloy casting which contains reinforcement fiber. The deformable portions 3 and the deformation controlling portions 4 are integrally molded by combination of a molten material of an aluminum alloy (hereinafter, "molten aluminum alloy") and a premolded body 15 of a reinforcement fiber molded body (see FIG. 5) as will be described later.

Preferable examples of the aluminum alloy are Al—Mn—Fe—Mg alloys. By appropriately setting the contents of respective elements, the Al—Mn—Fe—Mg alloys exhibit both improved castability and elongation while maintaining the strength of the aluminum alloy. Thus, a high ductility material can be obtained which exhibits high elongation even if it is only casted. Specifically, the aluminum alloys contain 0.5-2.5% of Mn component, 0.1-1.5% of Fe component, 0.01-1.2% of Mg component, and Al component which includes inevitable impurities as the remaining constituents (the numerals of contents herein represented by mass percent).

More preferably, at least one of 0.1-0.2 mass % of Ti component, 0.01-0.1 mass % of B component, and 0.01-0.2 mass % of Be component is added to an Al—Mn—Fe—Mg alloy which contains the above specified percentages of components. Should the contents of Ti component, B component, and Be component be excessively large, a bulky compound would be generated which would deteriorate the elongation of the material, although decreasing the crystal grain size of the casting could improve the characteristics of the material so that occurrence of casting cracks could be prevented. Thus, the contents of Ti component, B component, and Be component are respectively set in the above ranges, whereby occurrence of casting cracks is further decreased while decrease in elongation is prevented.

Note that, for example, an Al—Si alloy may be used instead of the above-described Al—Mn—Fe—Mg alloy. In the case of this alloy, casting is implemented by using a high vacuum die casting method. Alternatively, a Mg alloy or any other suitable metal may be used.

Preferably, the reinforcement fiber may be alumina fiber, silica fiber, silicon carbide fiber, or the like. In the case of aluminum fiber or silica fiber, for example, the average fiber diameter may be 3 μm to 5 μm, and the fiber length may be 5 mm to 10 mm. In the case of silicon carbide fiber, for example, the average fiber diameter may be 10 μm to 15 μm, and the fiber length may be 5 mm to 10 mm. The fiber volume fraction of the reinforcement fiber molded body (premolded body 15) is preferably 5-10%. Part of the premolded body 15 in which the reinforcement fiber does not exist is a void.

Instead of the reinforcement fiber, a steel or stainless wire which has the average diameter of 8 μm to 12 μm and the length of several centimeters may be contained in the aluminum alloy casting. In this case also, in the same way as that described above for the reinforcement fiber, a premolded body of the wire is formed and combined with molten aluminum alloy to form a composite. The wire volume fraction of the resultant premolded body is preferably 5-10%.

The premolded body combined with the molten alloy may be a porous metal body. For example, a nickel porous body with the porosity of 98% (tradename: nickel cermet) can be used as the premolded body. Alternatively, a premolded body of a metal which has a plurality of through-holes extending in a direction corresponding to the direction of tube axis Z (a metal less susceptible to compressive plastic deformation casting under the compression load in the direction of tube axis Z and less susceptible to fracture than an aluminum alloy (e.g., steel)) can be used. In this case, the through-holes are filled with the molten aluminum alloy.

Figure 3:
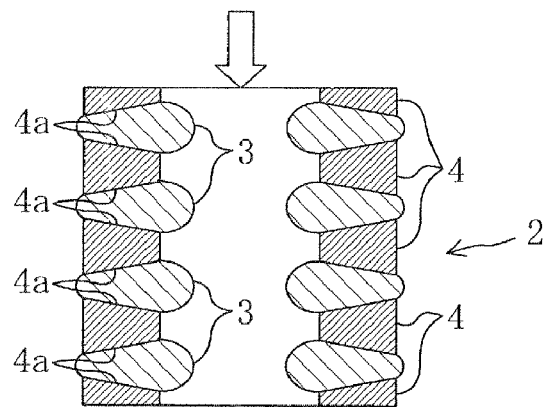
FIG. 3 is a cross-sectional view showing a deformed state of the main body of the impact energy absorber when a compression load equal to or greater than a predetermined value (a compression load which does not cause deformation controlling portions to undergo compressive plastic deformation) is input to the main body in its tube axis direction.

Thus, the deformation controlling portions 4 are reinforced by combination of the aluminum alloy which is the constituent material of the deformable portions 3 and the reinforcement fiber, so that the deformation controlling portions 4 are less susceptible to compressive plastic deformation and fracture than the deformable portions 3 against a compression load in the direction of tube axis Z. Therefore, when a compression load equal to or greater than the predetermined value (provided that it does not cause the deformation controlling portions 4 to undergo compressive plastic deformation) is input to the main body 2 in the direction of tube axis Z, the deformable portions 3 undergo compressive plastic deformation in the direction of tube axis Z while the deformation controlling portions 4 are free from compressive plastic deformation (but undergo elastic deformation) as shown in FIG. 3. Due to the slope surfaces 4a of the deformation controlling portions 4, the deformable portions 3 undergo plastic deformation in the radially inward directions of the main body 2 concurrently with compressive plastic deformation in the direction of tube axis Z. This plastic deformation of the deformable portions 3 absorbs the above compression load. Meanwhile, the deformable portions 3 expand in the radially inward directions of the main body 2 while the dimension in the direction of tube axis Z decreases. Thus, the entire main body 2 stably deforms in the direction of tube axis Z without causing buckling deformation. Note that the deformable portions 3 also undergo a small plastic deformation in the radially outward directions of the main body 2 along with compressive plastic deformation in the direction of tube axis Z. The amount of the small outward plastic deformation is much smaller than the amount of the forced inward plastic deformation.

Figure 4:
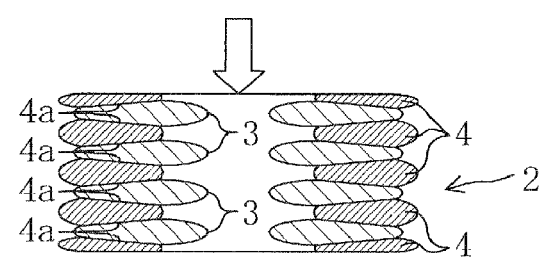
FIG. 4 is a cross-sectional view showing another deformed state of the main body of the impact energy absorber when a compression load having a magnitude which can cause deformation controlling portions to undergo compressive plastic deformation is input to the main body in its tube axis direction.

When a compression load having a magnitude which can cause the deformation controlling portions 4 to undergo compressive plastic deformation is input to the main body 2 in the direction of tube axis Z, the deformation controlling portions 4 also undergo compressive plastic deformation in the direction of tube axis Z as shown in FIG. 4. Further, due to the reaction force acting on the slope surfaces 4a from the deformable portions 3, the deformation controlling portions 4 undergo plastic deformation in the radially outward directions of the main body 2. Even during this plastic deformation of the deformation controlling portions 4, the deformation controlling portions 4 assist the deformable portions 3 to undergo plastic deformation in the radially inward directions of the main body 2 concurrently with compressive plastic deformation in the direction of tube axis Z till the inclination angle θ of the slope surfaces 4a reaches 0. Even when the inclination angle θ of the slope surfaces 4a reaches 0 due to the plastic deformation of the deformation controlling portions 4, the amount of plastic deformation of the deformable portions 3 is already considerably large at that point in time. As a result, even if the compression load is continuously exerted after that point in time, the entire main body 2 deforms in the direction of tube axis Z without causing buckling deformation.

Figure 5:
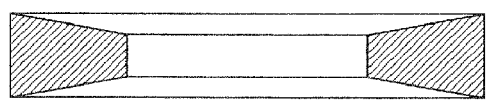
FIG. 5 is a cross-sectional view of a premolded body.

To fabricate the impact energy absorber 1, a plurality of premolded bodies 15 are first molded as shown in FIG. 5, from which the plurality of deformation controlling portions 4 can be formed by combination with the molten aluminum alloy. The shape of the premolded bodies 15 is the same as that of the deformation controlling portions 4. Note that the premolded body 15 shown in FIG. 5 is used for formation of three pieces of the deformation controlling portions 4 rather than two pieces of the deformation controlling portions 4 placed at the both axial ends of the main body 2 with respect to the direction of tube axis Z.

The respective premolded bodies 15 are fabricated as described below. First, the reinforcement fiber, water, and additives are poured in an unshown container, and the mixture in the container is stirred to prepare slurry 24 (see FIG. 6). The additives include a strengthening agent for securing the strength of the premolded bodies 15 (e.g., granular alumina sol), an adhesion enhancer for enhancing adhesion of the strengthening agent to the reinforcement fiber (e.g., ammonium sulfate), and a dispersant for improving the dispersibility of the reinforcement fiber (e.g., polyamide).

Figure 6:
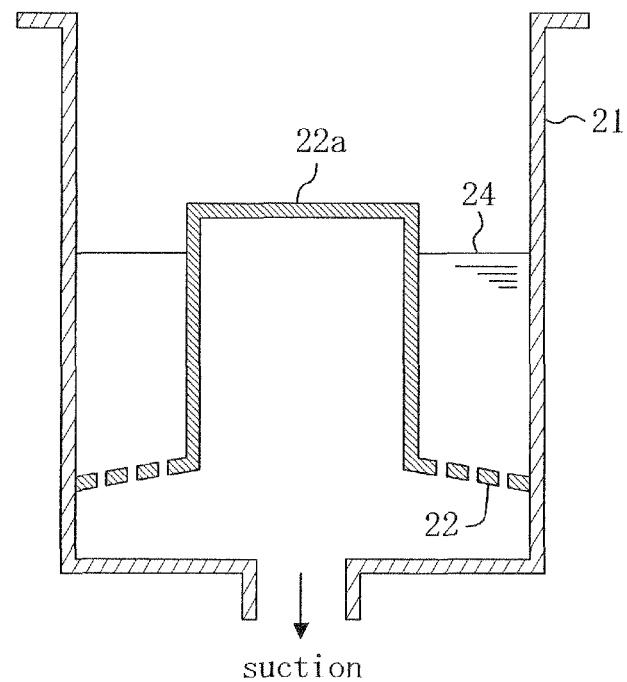
FIG. 6 is a cross-sectional view of a container of a filtration device during removal of liquid components from slurry.

Then, as shown in FIG. 6, liquid components, such as water, are removed from the slurry 24 by a filtering device 20. The filtering device 20 includes a container 21 which has a porous filter 22 therein and a suction device (not shown) which is connected to the bottom of the container 21. The porous filter 22 has, at its center, a protrusion 22a protruding upward (which does not work as a filter). Part of the filter 22 surrounding the protrusion 22a (which works as a filter) constitutes a slope which is inclined relative to the horizontal plane and which corresponds to the slope surface 4a of the deformation controlling portion 4. The slurry 24 is poured in the container 21 over the part of the porous filter 22 surrounding the protrusion 22a. Thereafter, the suction device is used to remove (suck) the liquid components, such as water, from the slurry 24 via the porous filter 22.

Figure 7:
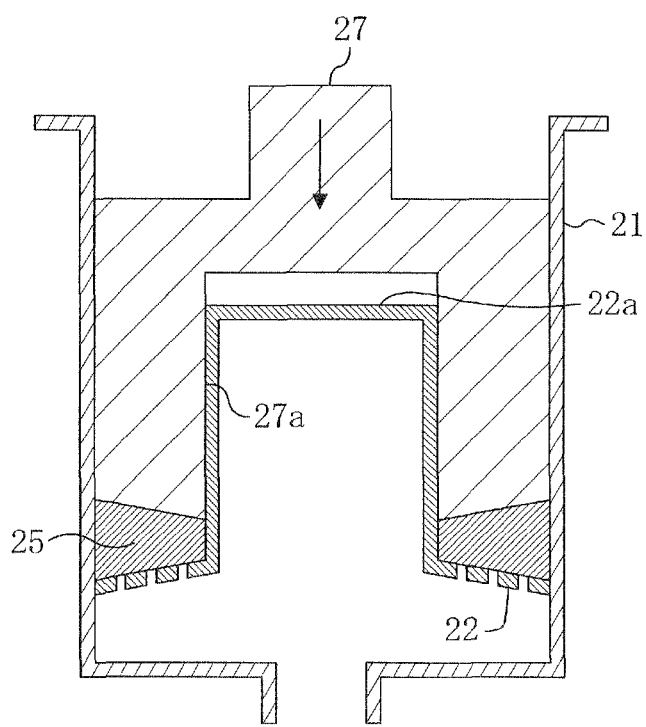
FIG. 7 is a cross-sectional view of the container of the filtration device during compression of a liquid-removed material obtained by removing the liquid components from slurry, which corresponds to FIG. 6.

Then, as shown in FIG. 7, a liquid-removed element 25 obtained by removing the liquid components from the slurry 24 is compressed. Specifically, in the container 21, the liquid-removed element 25 remaining over the part of the porous filter 22 surrounding the protrusion 22a is compressed by a punch 27 falling from the above so as to have the shape of the premolded body 15. The lower face of the punch 27 has a fitting hole 27a at its center, in which the protrusion 22a is to fit. Part of the lower surface surrounding the fitting hole 27a is inclined relative to the horizontal plane so as to correspond to the slope surface 4a of the deformation controlling portion 4. Note that, when molding the premolded bodies 15 for forming the deformation controlling portions 4 which are to be placed at the both axial ends of the main body 2 with respect to the direction of tube axis Z, the lower surface of the punch 27 has a horizontally extending surface with no inclination.

Thereafter, the compression-molded liquid-removed element 25 is dried and then sintered. The sintering is carried out, for example, at 640-840° C. for 1.5 hours. Thus, preparation of the premolded body 15 of the reinforcement fiber molded body is completed.

Figure 8:
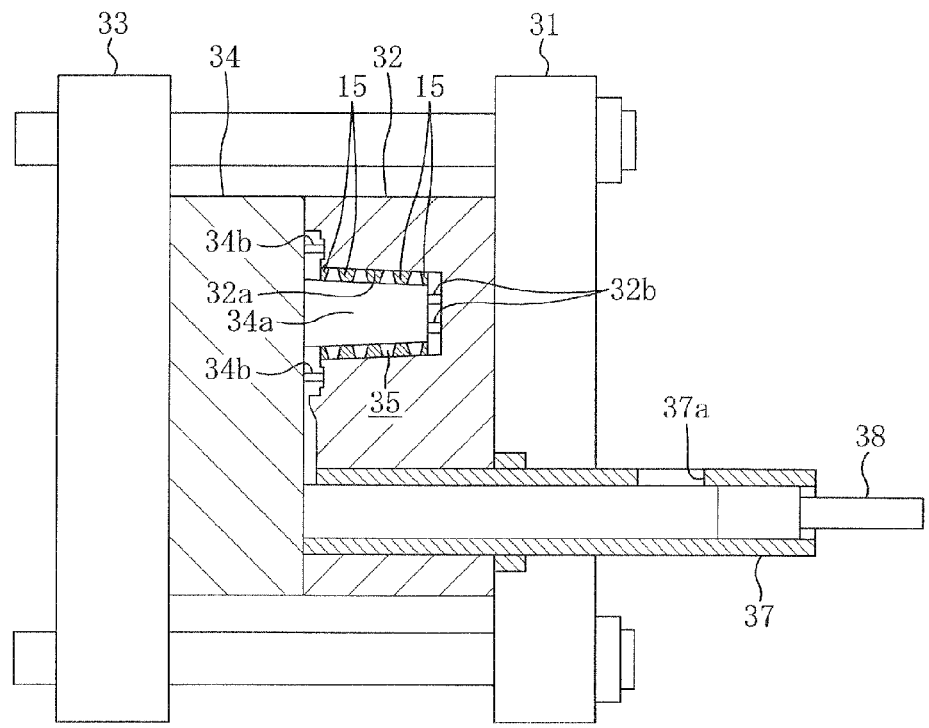
FIG. 8 is a cross-sectional view of a casting mold.

Then, the casting mold 30 as shown in FIG. 8 is used to form (mold) the impact energy absorber 1. This casting mold 30 includes a fixed mold 32 fixedly secured to a fixed mold plate 31 and a movable mold 34 fixedly secured to a movable mold plate 33 which is supported movably in the lateral directions of FIG. 8 relative to the fixed mold plate 31. The fixed mold 32 has a recess 32a opened toward the movable mold 34. On the other hand, the movable mold 34 has a protrusion 34a which is to enter the recess 32a. The gap between the recess 32a and the protrusion 34a is a cavity 35. The external surface of the protrusion 34a has a plurality of grooves (not shown) for respectively supporting the plurality of premolded bodies 15. The fixed mold 32 has a plurality of pins 32b for respectively forming the plurality of bolt insertion holes 8a of the second fixing portion 8. The movable mold 34 has a plurality of pins 34b for respectively forming a plurality of bolt insertion holes 7a of the first fixing portion 7.

The casting mold 30 has an injection sleeve 37 for supplying molten aluminum alloy into the cavity 35. The injection sleeve 37 has an opening 37a for supplying the molten alloy. The injection sleeve 37 also includes an injection plunger 38 which slidably fits through the injection sleeve 37. By moving the injection plunger 38 to the left side of FIG. 8, the molten alloy supplied through the opening 37a into the injection sleeve 37 is injected into the cavity 35.

To fabricate the impact energy absorber 1 using the casting mold 30, the plurality of premolded bodies 15 molded as described above are placed in the plurality of grooves formed in the protrusion 34a of the movable mold 34 so as to be supported therein with the casting mold 30 being open. Thereafter, the movable mold 34 is shifted toward the fixed mold 32 to close the casting mold 30. As a result, the plurality of premolded bodies 15 are set in the cavity 35 of the casting mold 30.

Then, molten aluminum alloy (at about 700° C.) is supplied into the injection sleeve 37 via the opening 37a. This molten alloy is injected by the injection plunger 38 into the cavity 35. As a result, in part of the cavity 35 in which the premolded bodies 15 do not exist, the deformable portions 3 and the first and second fixing portions 7 and 8 are molded. Meanwhile, the voids in the premolded body 15 are filled with the molten alloy so that the premolded bodies 15 and the molten alloy are combined into a composite. As a result, the deformation controlling portions 4 are integrally molded with the deformable portions 3 and the first and second fixing portions 7 and 8. The molten alloy in the cavity 35 is then solidified, and casting of the impact energy absorber 1 is completed.

Thus, in this example embodiment, the main body 2 of the impact energy absorber 1 is integrally molded such that the plurality of deformable portions 3 and the plurality of deformation controlling portions 4 which are adapted to control the direction of plastic deformation of the deformable portions 3 are alternately stacked in the direction of tube axis Z of the main body 2. Surface of each deformation controlling portion 4 which are in contact with the deformable portions 3 are the slope surfaces 4a. When a compression load equal to or greater than the predetermined value is input to the main body 2 in the direction of tube axis Z, the deformable portions 3 undergo plastic deformation in the radially inward directions of the main body 2 concurrently with compressive plastic deformation in the direction of tube axis Z. The deformable portions 3 expand in the radially inward directions of the main body 2 while the dimension in the direction of tube axis Z decreases. Thus, the entire main body 2 stably deforms in the direction of tube axis Z without causing buckling deformation. The deformable portions 3 are integrally molded with the deformation controlling portions 4 and are therefore less susceptible to separation from the deformation controlling portions 4. This also ensures that the main body 2 stably deforms in the direction of tube axis Z. As a result, even when a force which could push down the main body 2 in a radial direction is input to the main body 2 concurrently with a compression load input in the direction of tube axis Z, the main body 2 is less susceptible to buckling deformation and surely deforms in the direction of tube axis Z, so that the absorbability for the compression load can be improved. Since the deformation resistance against plastic deformation of the deformable portions 3 in the radially inward directions of the main body 2 is larger than the deformation resistance against plastic deformation in the radially outward directions, the amount of absorbed compression load can be further increased. Even when the deformable portions 3 and the deformation controlling portions 4 are increased in number, the deformable portions 3 and the deformation controlling portions 4 can be firmly and readily combined together by integral molding. Thus, the handleability of the impact energy absorber 1 during transportation or assemblage into the vehicle 100 can be improved.

Example Embodiment 2

Figure 9:
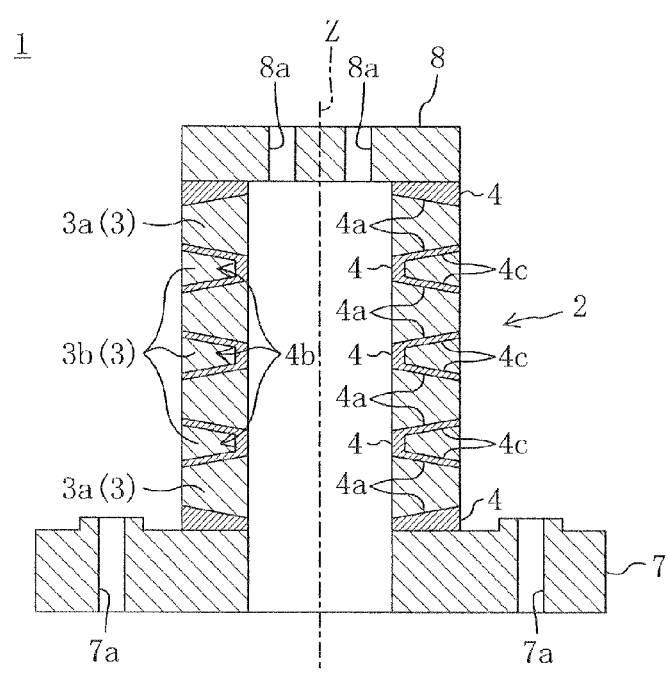
FIG. 9 is a cross-sectional view showing example embodiment 2, which corresponds to FIG. 1.

FIG. 9 shows example embodiment 2 in which the shape of the deformation controlling portions 4 is different from that of example embodiment 1.

Specifically, in this example embodiment, the exterior shape of each deformation controlling portion 4 in the main body 2 of the impact energy absorber 1 (the shape of the slope surface 4a) is the same as that of example embodiment 1. However, three pieces of the deformation controlling portions 4, rather than two pieces of the deformation controlling portions 4 placed at the both axial ends of the main body 2 with respect to the direction of tube axis Z, have trenches 4b which are recessed from the outer perimeter surface (the surface which constitutes the outer perimeter surface of the main body) toward the inner perimeter surface and which run along the entire perimeter of the deformation controlling portions 4. In the trenches 4b, the deformable portions 3 are provided. Also, as in example embodiment 1, the deformable portions 3 are provided in the respective gaps between the five pieces of the deformation controlling portions 4. Hereinafter, when distinguishing between the deformable portions 3 provided between the deformation controlling portions 4 and the deformable portions 3 provided in the trenches 4b, the former are referred to as "large deformable portions 3a" while the latter are referred to as "small deformable portions 3b". The volume of the small deformable portion 3b is smaller than that of the large deformable portion 3a.

Due to the above configuration of the deformable portions 3, it can be said that, on the inner perimeter side of the main body 2, four pieces of the deformable portions 3 (large deformable portions 3a) and five pieces of the deformation controlling portions 4 are alternately stacked in the direction of tube axis Z of the main body 2. On the outer perimeter side of the main body 2, seven pieces of the deformable portions 3 (4 pieces of the large deformable portions 3a and 3 pieces of the small deformable portions 3b) and eight pieces of the deformation controlling portions 4 are alternately stacked in the direction of tube axis Z of the main body 2.

The dimension of each trench 4b in the direction of tube axis Z gradually increases along the radially outward directions of the main body 2. Specifically, surfaces of the deformation controlling portions 4 which are in contact with the small deformable portions 3b are also slope surfaces 4c which extend in the radially outward directions of the main body 2 with an inclination to one side or the other side with respect to the direction of tube axis Z. The slope surfaces 4c have such an inclination that, when a compression load equal to or greater than a predetermined value is input to the main body 2 in the direction of tube axis Z, the small deformable portions 3b undergo plastic deformation in the radially outward directions of the main body 2 concurrently with compressive plastic deformation in the direction of tube axis Z.

In this example embodiment also, as in example embodiment 1, the deformable portions 3 are composed of an aluminum alloy casting, and the deformation controlling portions 4 are composed of an aluminum alloy casting which contains reinforcement fiber. Note that, as the materials of the deformable portions 3 and the deformation controlling portions 4, the other specific example materials described above in example embodiment 1 may be used herein. This also applies to example embodiments 3-5 which will be described later. The deformable portions 3 and the deformation controlling portions 4 are integrally molded by combination of the molten material of an aluminum alloy (preferably, an Al—Mn—Fe—Mg alloy) and a premolded body of a reinforcement fiber molded body.

Figure 10:
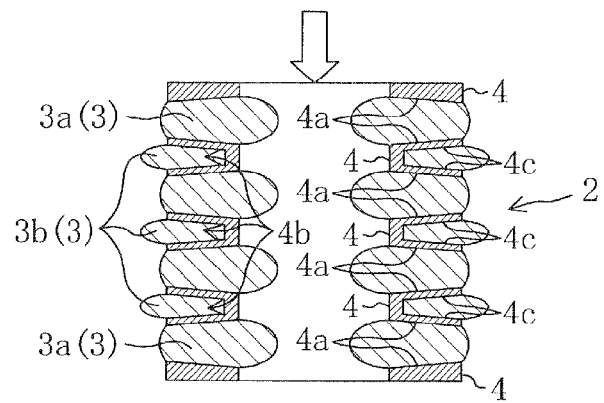
FIG. 10 is a cross-sectional view of example embodiment 2, which corresponds to FIG. 3.

When a compression load equal to or greater than the predetermined value (provided that it does not cause the deformation controlling portions 4 to undergo compressive plastic deformation) is input to the main body 2 in the direction of tube axis Z, the large deformable portions 3a undergo plastic deformation in the radially inward directions of the main body 2 concurrently with compressive plastic deformation in the direction of tube axis Z as shown in FIG. 10 as in example embodiment 1. Here, the amount of elastic deformation of the deformation controlling portions 4 in the direction of tube axis Z is larger on the outer perimeter side than on the inner perimeter side because of the presence of the trenches 4b. Due to this elastic deformation of the deformation controlling portions 4 on the outer perimeter side, the small deformable portions 3b undergo plastic deformation in the radially outward directions of the main body 2 concurrently with compressive plastic deformation in the direction of tube axis Z. The amount of the plastic deformation of the small deformable portions 3b in the radially outward directions of the main body 2 is smaller than the amount of the plastic deformation of the large deformable portions 3a in the radially inward direction of the main body 2.

Note that the elastic deformation of the deformation controlling portions 4 on the outer perimeter side decreases the inclination angle θ of the slope surfaces 4a. Considering this decrease of the inclination angle θ, the inclination angle θ is preferably greater than that of example embodiment 1.

When a compression load having a magnitude which can cause the deformation controlling portions 4 to undergo compressive plastic deformation is input to the main body 2 in the direction of tube axis Z, the deformation controlling portions 4 also undergo compressive plastic deformation in the direction of tube axis Z. At this point in time, the reaction force acting on the slope surfaces 4a from the large deformable portions 3a and the reaction force acting on the slope surfaces 4c from the small deformable portions 3b cancel each other (although the reaction force acting on the slope surfaces 4a from the large deformable portions 3a is slightly larger), so that the deformation controlling portions 4 do not undergo as large a plastic deformation in the radially outward directions of the main body 2 as in example embodiment 1. Even when the deformation controlling portions 4 undergo plastic deformation, the entire main body 2 deforms in the direction of tube axis Z without causing buckling deformation as in example embodiment 1.

A method for fabricating the impact energy absorber 1 in this example embodiment is basically the same as that described above in example embodiment 1. First, a plurality of the premolded bodies are molded, from which the plurality of deformation controlling portions 4 can be formed by combination with the molten aluminum alloy. Then, with the resultant premolded bodies being set in the cavity 35 of the casting mold 30 which has been described in example embodiment 1, the molten aluminum alloy is supplied into the cavity 35, so that the molten alloy and the premolded bodies are combined into a composite, whereby the deformable portions 3, the deformation controlling portions 4, and the first and second fixing portions 7 and 8 are integrally molded. When molding the premolded bodies, trenches corresponding to the trenches 4b of the deformation controlling portions 4 are formed in the premolded bodies. The trenches formed in the premolded bodies can be formed by using a mold corresponding to the trenches which is placed in the container 21 of the filtering device 20.

Thus, in this example embodiment, the large deformable portions 3a undergo plastic deformation in the radially inward directions of the main body 2 concurrently with compressive plastic deformation in the direction of tube axis Z, while the small deformable portions 3b undergo plastic deformation in the radially outward directions of the main body 2 concurrently with compressive plastic deformation in the direction of tube axis Z. Therefore, while enjoying the advantages of example embodiment 1, all the deformable portions 3 expand in the radially outward and inward directions in a well balanced manner throughout the entire main body 2, so that buckling deformation of the main body 2 can more surely be prevented.

Example Embodiment 3

Figure 11:
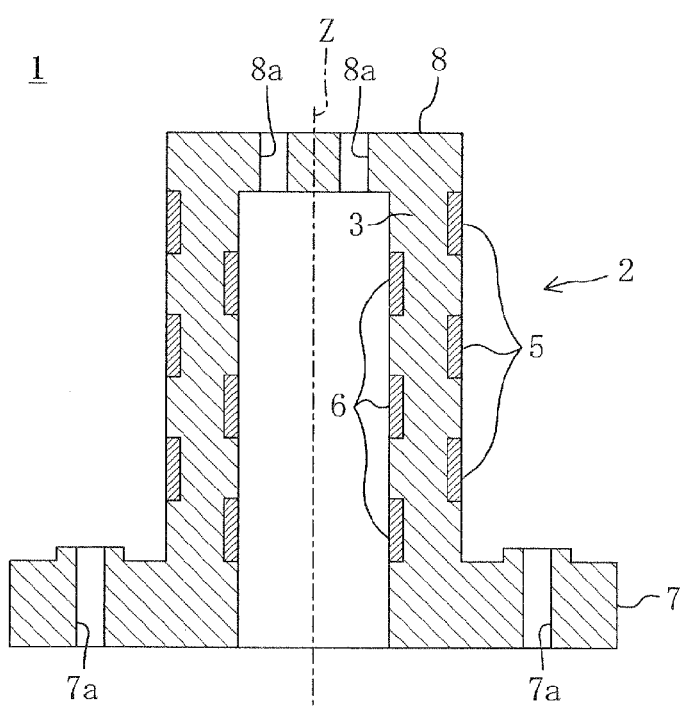
FIG. 11 is a cross-sectional view showing example embodiment 3, which corresponds to FIG. 1.

FIG. 11 shows example embodiment 3, in which a plurality of outer deformation controlling portions 5 are provided in the outer perimeter surface of the main body 2, and a plurality of inner deformation controlling portions 6 are provided in the inner perimeter surface of the main body 2, instead of the deformation controlling portions 4 of example embodiment 1.

Specifically, in this example embodiment, the main body 2 of the impact energy absorber 1 is integrally composed of a deformable portion 3, a plurality of outer deformation controlling portions 5 which are placed in the outer perimeter surface of the main body 2 at a plurality of positions along the direction of tube axis Z in an annular arrangement along a perimeter direction of the main body 2 and which are adapted to control the direction of the plastic deformation of the deformable portion 3, and a plurality of inner deformation controlling portions 6 which are placed in the inner perimeter surface of the main body 2 at a plurality of positions along the direction of tube axis Z in an annular arrangement along the perimeter direction of the main body 2 and which are adapted to control the direction of the plastic deformation of the deformable portion 3. The outer and inner deformation controlling portions 5 and 6 are alternately provided in the direction of tube axis Z of the main body 2. When a compression load equal to or greater than a predetermined value is input to the main body 2 in the direction of tube axis Z, part of the deformable portion 3 in the outer perimeter surface of the main body 2 is forced to undergo plastic deformation in the radially outward directions of the main body 2, while part of the deformable portion 3 in the inner perimeter surface of the main body 2 is forced to undergo plastic deformation in the radially inward directions of the main body 2, concurrently with compressive plastic deformation of the deformable portion 3 in the direction of tube axis Z.

In this example embodiment also, as in example embodiment 1, the deformable portion 3 is composed of an aluminum alloy casting, and the outer and inner deformation controlling portions 5 and 6 are composed of an aluminum alloy casting which contains reinforcement fiber. The deformable portion 3 and the outer and inner deformation controlling portions 5 and 6 are integrally molded by combination of the molten material of an aluminum alloy (preferably, an Al—Mn—Fe—Mg alloy) and a premolded body of a reinforcement fiber molded body. Note that the outer and inner deformation controlling portions 5 and 6 are preferably made of the same material, although they may be made of different materials.

In this example embodiment, the reinforcement fiber of the outer and inner deformation controlling portions 5 and 6 is preferably oriented so as to extend in the radial directions of the main body 2. This is for the purpose of making the outer and inner deformation controlling portions 5 and 6 undergo compressive plastic deformation straight in the direction of tube axis Z when a compression load having a magnitude which can cause the outer and inner deformation controlling portions 5 and 6 to undergo compressive plastic deformation is input to the main body 2 in the direction of tube axis Z, such that buckling deformation of the main body 2 can be prevented.

Figure 12:
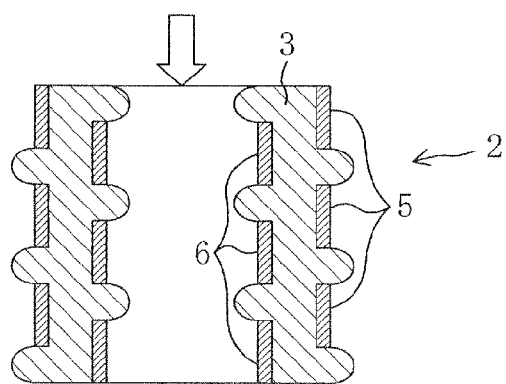
FIG. 12 is a cross-sectional view of example embodiment 3, which corresponds to FIG. 3.

The deformable portion 3 is provided in part of the main body 2 other than the outer and inner deformation controlling portions 5 and 6. Specifically, the deformable portion 3 is a single piece of element which extends throughout the entire main body 2 in the direction of tube axis Z. Due to the above arrangement of the outer and inner deformation controlling portions 5 and 6, the deformable portion 3 has the shape of bellows so that parts of the deformable portion 3 which are positioned in the outer perimeter surface of the main body 2 and parts of the deformable portion 3 which are positioned in the inner perimeter surface of the main body 2 alternately occur in the direction of tube axis Z. When a compression load equal to or greater than the predetermined value (provided that it does not cause the outer and inner deformation controlling portions 5 and 6 to undergo compressive plastic deformation) is input to the main body 2 in the direction of tube axis Z, the outer and inner deformation controlling portions 5 and 6 assist part of the deformable portion 3 in the outer perimeter surface of the main body 2 to undergo plastic deformation in the radially outward directions of the main body 2, and part of the deformable portion 3 in the inner perimeter surface of the main body 2 to undergo plastic deformation in the radially inward directions of the main body 2, concurrently with compressive plastic deformation of the deformable portion 3 in the direction of tube axis Z as shown in FIG. 12. The part of the deformable portion 3 which undergoes plastic deformation in the radially outward directions of the main body 2 and the part of the deformable portion 3 which undergoes plastic deformation in the radially inward directions of the main body 2 alternately occur in the direction of tube axis Z of the main body 2.

Figure 13:
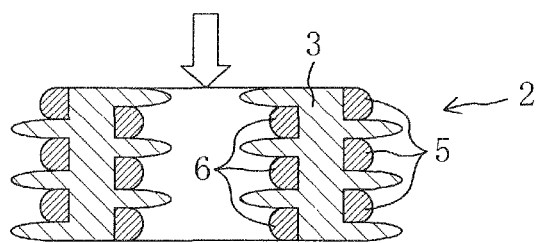
FIG. 13 is a cross-sectional view showing example embodiment 3, which corresponds to FIG. 4.

When a compression load having a magnitude which can cause the outer and inner deformation controlling portions 5 and 6 to undergo compressive plastic deformation is input to the main body 2 in the direction of tube axis Z, the outer and inner deformation controlling portions 5 and 6 also undergo compressive plastic deformation in the direction of tube axis Z as shown in FIG. 13. Here, as described above, due to the orientation of the reinforcement fiber in the outer and inner deformation controlling portions 5 and 6, the outer and inner deformation controlling portions 5 and 6 undergo compressive plastic deformation straight in the direction of tube axis Z. This compressive plastic deformation is accompanied by plastic deformation of the outer deformation controlling portions 5 in the radially outward directions of the main body 2 and plastic deformation of the inner deformation controlling portions 6 in the radially inward directions of the main body 2. Even when the outer and inner deformation controlling portions 5 and 6 undergo plastic deformation, the outer and inner deformation controlling portions 5 and 6 assist part of the deformable portion 3 in the outer perimeter surface of the main body 2 to undergo plastic deformation in the radially outward directions of the main body 2, and part of the deformable portion 3 in the inner perimeter surface of the main body 2 to undergo plastic deformation in the radially inward directions of the main body 2, concurrently with compressive plastic deformation of the deformable portion 3 in the direction of tube axis Z. At the point in time when the outer and inner deformation controlling portions 5 and 6 start plastic deformation, the deformable portion 3 which has undergone plastic deformation in advance has already been largely deformed in the radially outward and inward directions of the main body 2. Therefore, even when the outer and inner deformation controlling portions 5 and 6 undergo plastic deformation, the entire main body 2 deforms in the direction of tube axis Z without causing buckling deformation.

A method for fabricating the impact energy absorber 1 in this example embodiment is basically the same as that described above in example embodiment 1. First, a plurality of outer premolded bodies 16 (see FIG. 14) and a plurality of inner premolded bodies 17 (see FIG. 14) are molded, from which the plurality of outer deformation controlling portions 5 and the plurality of inner deformation controlling portions 6 can be formed by combination with the molten aluminum alloy. The outer and inner premolded bodies 16 and 17 have the same shape (ring shape) as the outer and inner deformation controlling portions 5 and 6, respectively. A method for molding the outer and inner premolded bodies 16 and 17 is basically the same as that described above in example embodiment 1.

Figure 14:
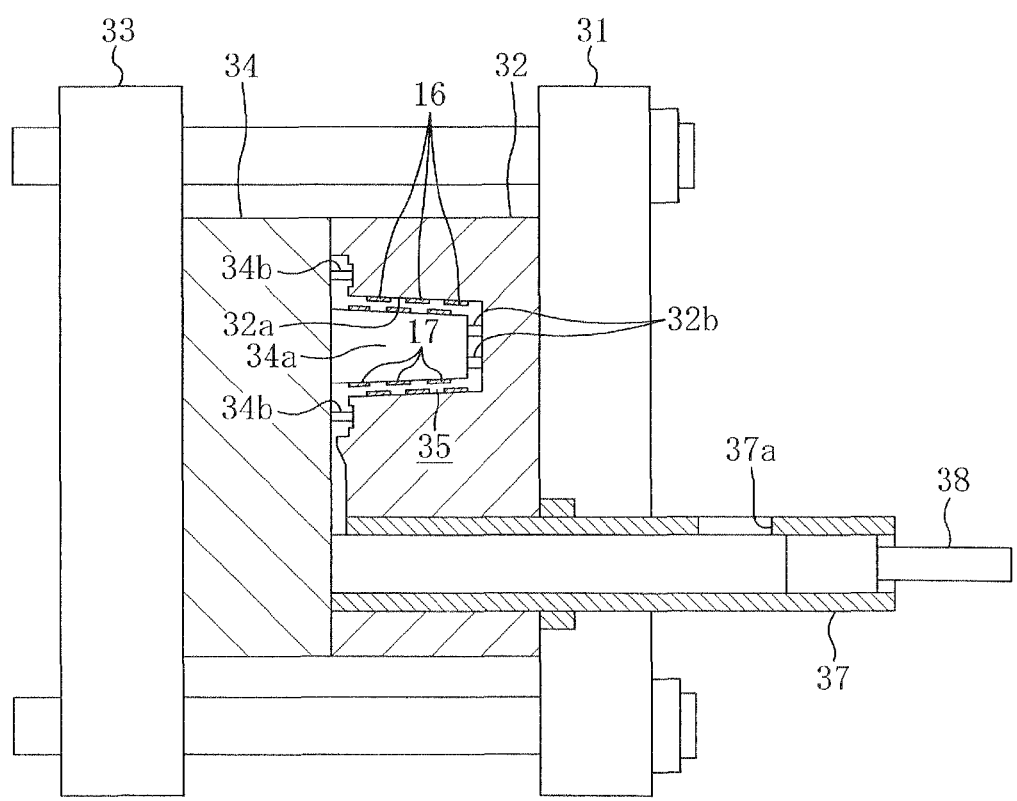
FIG. 14 is a cross-sectional view of a casting mold for fabricating the impact energy absorber of example embodiment 3.

Then, as shown in FIG. 14, the same casting mold 30 as that of example embodiment 1 is used to fabricate the impact energy absorber 1. In this example embodiment, the recess 32a of the fixed mold 32 has a plurality of grooves (not shown) in its side perimeter surface for supporting the plurality of outer premolded bodies 16. The protrusion 34a of the movable mold 34 has a plurality of grooves (not shown) in its outer perimeter surface for supporting the plurality of inner premolded bodies 17.

Then, while the casting mold 30 is open, the plurality of outer premolded bodies 16 are placed in the plurality of grooves formed in the recess 32a of the fixed mold 32 so as to be supported therein, and the plurality of inner premolded bodies 17 are placed in the plurality of grooves formed in the protrusion 34a of the movable mold 34 so as to be supported therein. Thereafter, the movable mold 34 is shifted toward the fixed mold 32 to close the casting mold 30. As a result, the outer and inner premolded bodies 16 and 17 are set in the cavity 35 of the casting mold 30.

Then, molten aluminum alloy (at about 700° C.) is supplied into the injection sleeve 37 via the opening 37a. This molten alloy is injected by the injection plunger 38 into the cavity 35. As a result, in part of the cavity 35 in which the outer and inner premolded bodies 16 and 17 do not exist, the deformable portion 3 and the first and second fixing portions 7 and 8 are molded. Meanwhile, the voids in the outer and inner premolded bodies 16 and 17 are filled with the molten alloy so that the outer and inner premolded bodies 16 and 17 and the molten alloy are combined into a composite. As a result, the outer and inner deformation controlling portions 5 and 6 are integrally molded with the deformable portion 3 and the first and second fixing portions 7 and 8. The molten alloy in the cavity 35 is then solidified, and casting of the impact energy absorber 1 is completed.

Thus, in this example embodiment, the main body 2 of the impact energy absorber 1 is formed by integrally molding the deformable portion 3 and the plurality of outer deformation controlling portions 5 and the plurality of inner deformation controlling portions 6 which are adapted to control the direction of plastic deformation of the deformable portion 3. The outer and inner deformation controlling portions 5 and 6 are alternately placed in the direction of tube axis Z of the main body 2. When a compression load equal to or greater than the predetermined value is input to the main body 2 in the direction of tube axis Z, part of the deformable portion 3 in the outer perimeter surface of the main body 2 undergoes plastic deformation in the radially outward directions of the main body 2 while part of the deformable portion 3 in the inner perimeter surface of the main body 2 undergoes plastic deformation in the radially inward directions of the main body 2 concurrently with compressive plastic deformation of the deformable portion 3 in the direction of tube axis Z. Therefore, the dimension of the deformable portion 3 in the direction of tube axis Z decreases while the deformable portion 3 expands in the radially outward and inward directions of the main body 2 in a well balanced manner. Thus, the entire main body 2 stably deforms in the direction of tube axis Z without causing buckling deformation. The deformable portion 3 is integrally molded with the outer and inner deformation controlling portions 5 and 6 and are therefore less susceptible to separation from the outer and inner deformation controlling portions 5 and 6. This also ensures that the main body 2 stably deforms in the direction of tube axis Z. As a result, even when a force which could push down the main body 2 in a radial direction is input to the main body 2 concurrently with a compression load input in the direction of tube axis Z, the main body 2 is less susceptible to buckling deformation and surely deforms in the direction of tube axis Z, so that the absorbability for the compression load can be improved. Even when the outer and inner deformation controlling portions 5 and 6 are increased in number, the outer and inner deformation controlling portions 5 and 6 can be firmly and readily secured to the deformable portion 3 by integral molding. Thus, the handleability of the impact energy absorber 1 during transportation or assemblage into the vehicle 100, or the like, can be improved.

Example Embodiment 4

Figure 15:
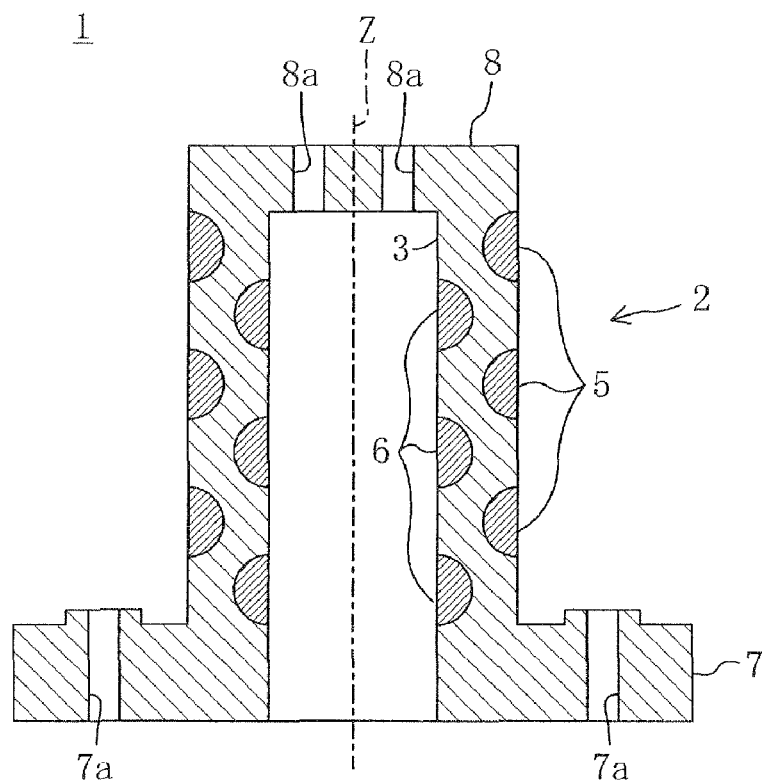
FIG. 15 is a cross-sectional view showing example embodiment 4, which corresponds to FIG. 1.

FIG. 15 shows example embodiment 4, in which the shape of the outer and inner deformation controlling portions 5 and 6 is different from that of example embodiment 3, and the other elements are the same as those of example embodiment 3.

Figure 16:
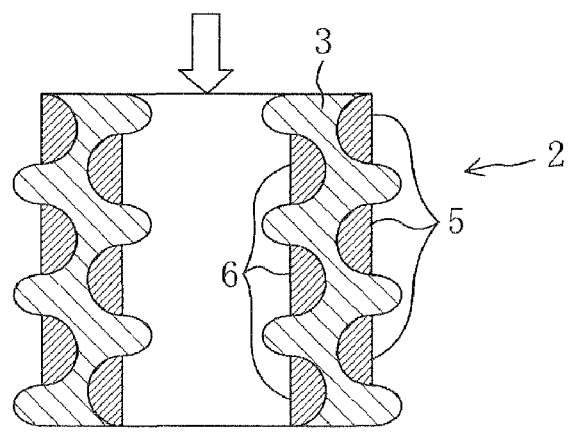
FIG. 16 is a cross-sectional view showing example embodiment 4, which corresponds to FIG. 3.

Specifically, in this example embodiment, the cross-sectional shape of the outer and inner deformation controlling portions 5 and 6 is semicircular, and the inner perimeter side of the outer deformation controlling portions 5 and the outer perimeter side of the inner deformation controlling portions 6 each have the shape of a circular arc. Thus, a compression load can uniformly act on the entire deformable portion 3 without being focused on a specific site. As a result, in the deformable portion 3, compressive plastic deformation and plastic deformation in the radially outward and inward directions of the main body 2 uniformly occur so that buckling deformation of the main body 2 is unlikely to occur. The state of the deformation of the main body 2 (the deformable portion 3) which occurs in this case is shown in FIG. 16. A method for fabricating the impact energy absorber 1 of this example embodiment is the same as that of example embodiment 3.

Therefore, in this example embodiment, the main body 2 deforms more stably in the direction of tube axis Z than in example embodiment 3, so that the absorbability for the compression load can be further improved.

Note that the cross-sectional shape of the outer and inner deformation controlling portions 5 and 6 is not limited to the above-described examples of example embodiments 3 and 4. Various cross-sectional shapes, such as trapezoidal, triangular, square, circular, etc., are applicable.

Example Embodiment 5

Figure 17:
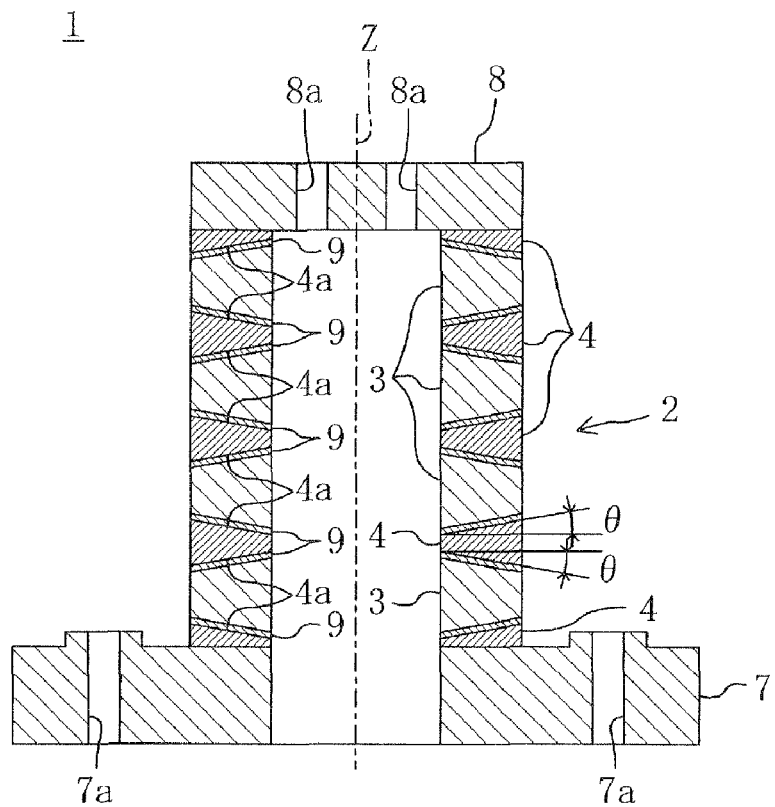
FIG. 17 is a cross-sectional view showing example embodiment 5, which corresponds to FIG. 1.

FIG. 17 shows example embodiment 5, in which shear deformation enhancing layers 9 are provided at the borders between the slope surfaces 4a and the deformable portions 3 in the impact energy absorber 1 of example embodiment 1.

The shear deformation enhancing layers 9 enhance shear deformation of end parts of the deformable portions 3 near the borders relative to the slope surfaces 4a when a compression load equal to or greater than a predetermined value is input to the main body 2 in the direction of tube axis Z. Specifically, when a compression load equal to or greater than the predetermined value is input to the main body 2, shear force acts at or near the borders between the slope surfaces 4a and the deformable portions 3 due to the inclination of the slope surfaces 4a such that the end parts of the deformable portions 3 near the borders are shifted in the radially inward directions of the main body 2 along the slope surfaces 4a. If the shear deformation enhancing layers 9 are made of such a material that the end parts of the deformable portions 3 near the borders readily undergo shear deformation relative to the slope surfaces 4a, the shear force causes the end parts of the deformable portions 3 near the borders to undergo shear deformation relative to the slope surfaces 4a, so that the deformable portions 3 can readily undergo plastic deformation in the radially inward directions of the main body 2.

The inclination angle θ of each slope surface 4a is preferably 30° to 60°, and more preferably 40° to 50°, as in example embodiment 1. Some of the slope surfaces 4a which extend in the radially outward directions of the main body 2 with an inclination to one side with respect to the direction of tube axis Z and the others slope surfaces 4a which extend in the radially outward directions of the main body 2 with an inclination to the other side with respect to the direction of tube axis Z preferably have the same inclination angle but may have different inclination angles.

In this example embodiment also, as in example embodiment 1, the deformable portions 3 are composed of an aluminum alloy casting, and the deformation controlling portions 4 are composed of an aluminum alloy casting which contains reinforcement fiber. Also, the shear deformation enhancing layers 9 are composed of an aluminum alloy casting which contains reinforcement fiber. The deformable portions 3, the deformation controlling portions 4, and the shear deformation enhancing layers 9 are integrally molded by combination of the molten material of an aluminum alloy (preferably, an Al—Mn—Fe—Mg alloy) and a premolded body of a reinforcement fiber molded body 18 (see FIG. 20).

The reinforcement fiber for the deformation controlling portions 4 and the shear deformation enhancing layers 9 may be selected from the examples described in example embodiment 1. The same type of reinforcement fiber is preferably used in the deformation controlling portions 4 and the shear deformation enhancing layers 9, although different types of reinforcement fibers may be used.

The reinforcement fiber volume fraction in the deformation controlling portions 4 is preferably 5-10% as in example embodiment 1. The reinforcement fiber volume fraction in the shear deformation enhancing layers 9 is larger than that in the deformation controlling portions 4. The reinforcement fiber of the shear deformation enhancing layers 9 is oriented so as to extend generally along the slope surfaces 4a. The reinforcement fiber volume fraction of the shear deformation enhancing layers 9 is large. Under such conditions, interposition of the shear deformation enhancing layers 9 leads to decrease in bonding strength between the deformable portions 3 and the deformation controlling portions 4 against the shear force. As a result, the end parts of the deformable portions 3 near the borders can readily undergo shear deformation in the radially inward directions of the main body 2 relative to the slope surfaces 4a. To enhance the shear deformation, the reinforcement fiber volume fraction in the shear deformation enhancing layers 9 is preferably 20-25%. This is because, if lower than 20%, the shear deformation cannot sufficiently be enhanced whereas, if higher than 25%, the voids in the premolded bodies 18 become smaller so that the filling rate of the molten alloy deteriorates.

Figure 18:
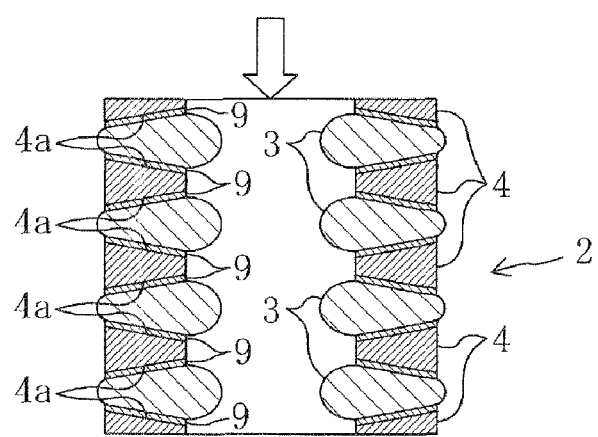
FIG. 18 is a cross-sectional view showing example embodiment 5, which corresponds to FIG. 3.

Thus, the deformation controlling portions 4 are reinforced by combination of the aluminum alloy which is a constituent material of the deformable portions 3 and the reinforcement fiber, so that the deformation controlling portions 4 are less susceptible to compressive plastic deformation and fracture than the deformable portions 3 against compression load in the direction of tube axis Z. Therefore, when a compression load equal to or greater than the predetermined value (provided that it does not cause the deformation controlling portions 4 to undergo compressive plastic deformation) is input to the main body 2 in the direction of tube axis Z, the deformable portions 3 undergo compressive plastic deformation in the direction of tube axis Z while the deformation controlling portions 4 are free from compressive plastic deformation (but undergo elastic deformation) as shown in FIG. 18. Due to the slope surfaces 4a of the deformation controlling portions 4, the deformable portions 3 undergo plastic deformation in the radially inward directions of the main body 2 concurrently with compressive plastic deformation in the direction of tube axis Z. Further, since the shear deformation enhancing layers 9 are provided at the borders between the slope surfaces 4a and the deformable portions 3, the deformable portions 3 more readily undergo plastic deformation in the radially inward directions of the main body 2 due to the shear deformation enhancing layers 9. This plastic deformation of the deformable portions 3 absorbs the above compression load. Meanwhile, the deformable portions 3 expand in the radially inward directions of the main body 2 while the dimension in the direction of tube axis Z decreases. Thus, the entire main body 2 stably deforms in the direction of tube axis Z without causing buckling deformation. Note that the deformable portions 3 also undergo a small plastic deformation in the radially outward directions of the main body 2 along with compressive plastic deformation in the direction of tube axis Z. The amount of the small outward plastic deformation is much smaller than the amount of the forced inward plastic deformation.

Figure 19:
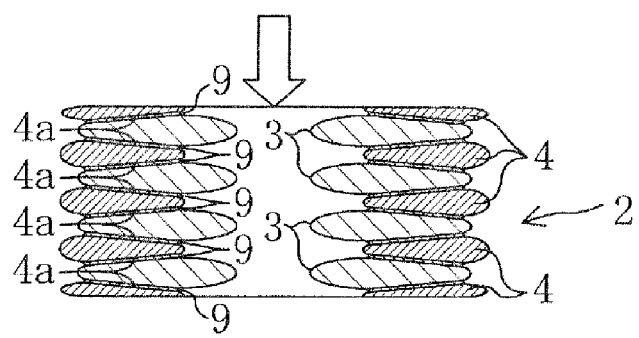
FIG. 19 is a cross-sectional view showing example embodiment 5, which corresponds to FIG. 4.

When a compression load having a magnitude which can cause the deformation controlling portions 4 to undergo compressive plastic deformation is input to the main body 2 in the direction of tube axis Z, the deformation controlling portions 4 also undergo compressive plastic deformation in the direction of tube axis Z as shown in FIG. 19. Further, due to the reaction force acting on the slope surfaces 4a from the deformable portions 3, the deformation controlling portions 4 undergo plastic deformation in the radially outward directions of the main body 2. Even during this plastic deformation of the deformation controlling portions 4, the deformation controlling portions 4 assist the deformable portions 3 to undergo plastic deformation in the radially inward directions of the main body 2 concurrently with compressive plastic deformation in the direction of tube axis Z till the inclination angle of the slope surfaces 4a reaches 0. Even when the inclination angle of the slope surfaces 4a reaches 0 due to the plastic deformation of the deformation controlling portions 4, the amount of plastic deformation of the deformable portions 3 is already considerably large at that point in time. As a result, even if the compression load is continuously exerted after that point in time, the entire main body 2 deforms in the direction of tube axis Z without causing buckling deformation.

Note that there is a probability that fracture (shear fracture) occurs at the interfaces between the shear deformation enhancing layers 9 and the deformable portions 3 (or the slope surfaces 4a) when the compression load equal to or greater than the predetermined value is input to the main body 2. However, even in the case of fracture, the deformable portions 3 still undergo plastic deformation in the radially inward directions of the main body 2 due to the slope surfaces 4a. Indeed, thanks to the fracture, the deformable portions 3 readily undergo plastic deformation in the radially inward directions of the main body 2.

Figure 20:
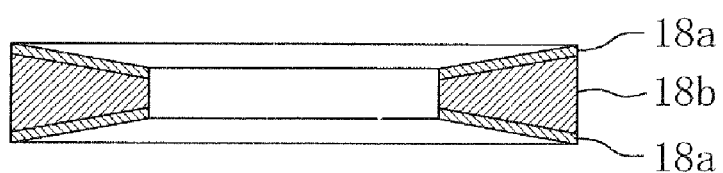
FIG. 20 is a cross-sectional view of a premolded body molded for fabrication of the impact energy absorber of example embodiment 5.

To fabricate the impact energy absorber 1, a plurality of premolded bodies 18 are first molded as shown in FIG. 20, from which the plurality of deformation controlling portions 4 can be formed by combination with the molten aluminum alloy. End parts 18a of the premolded body 18 corresponding to the slope surfaces 4a are composed of a material for formation of the shear deformation enhancing layers 9 in a combination process which will be described later. Specifically, the entire premolded body 18 including the end parts 18a is composed of a reinforcement fiber molded body. The reinforcement fiber volume fraction of the end parts 18a is greater than that of the other part 18b of the premolded body 18. Part of the premolded body 18 in which the reinforcement fiber does not exist is a void. Note that the premolded body 18 shown in FIG. 20 is used for formation of three pieces of the deformation controlling portions 4 rather than two pieces of the deformation controlling portions 4 placed at the both axial ends of the main body 2 with respect to the direction of tube axis Z. The two pieces of the deformation controlling portions 4 placed at the both axial ends of the main body 2 with respect to the direction of tube axis Z each have only one end part 18a in which the reinforcement fiber volume fraction is greater.

Each premolded body 18 is prepared as described in the following. Specifically, the method described in example embodiment 1 is used to compression-mold first liquid-removed elements which constitute the end parts 18a and a second liquid-removed element which constitutes the other part 18b by compression. The thickness of the first liquid-removed elements after compression molding is small, and therefore, the reinforcement fiber is oriented so as to extend generally along the end faces of the first liquid-removed elements with respect to the thickness direction.

Then, the first and second liquid-removed elements are separately dried. Thereafter, the first liquid-removed elements are stacked on both or one of the surfaces of the second liquid-removed elements for sintering. The sintering is carried out, for example, at 640-840° C. for 1.5 hours. Thus, preparation of the premolded body 18 of the reinforcement fiber molded body is completed.

Then, the casting mold 30 which has been described in example embodiment 1 is used to fabricate the impact energy absorber 1. Specifically, while the casting mold 30 is open, the plurality of premolded bodies 18 prepared above are placed in the plurality of grooves formed in the protrusion 34a of the movable mold 34 so as to be supported therein. Thereafter, the movable mold 34 is shifted toward the fixed mold 32 to close the casting mold 30. Then, molten aluminum alloy (at about 700° C.) is supplied into the injection sleeve 37 via the opening 37a. This molten alloy is injected by the injection plunger 38 into the cavity 35. As a result, in part of the cavity 35 in which the premolded bodies 18 do not exist, the deformable portions 3 and the first and second fixing portions 7 and 8 are molded. Meanwhile, the voids in the premolded body 18 are filled with the molten alloy so that the premolded bodies 18 and the molten alloy are combined into a composite. As a result, the deformation controlling portions 4 are integrally molded with the deformable portions 3 and the first and second fixing portions 7 and 8. In this integral molding, the end parts 18a of the premolded body 18 change into the shear deformation enhancing layers 9, and the other parts 18b change into the deformation controlling portions 4. Thus, the shear deformation enhancing layers 9 are also integrally molded with the deformable portions 3 and the deformation controlling portions 4. The molten alloy in the cavity 35 is then solidified, and casting of the impact energy absorber 1 is completed.

Thus, in this example embodiment, the main body 2 of the impact energy absorber 1 is integrally molded such that the deformable portions 3 and the deformation controlling portions 4 are alternately stacked in the direction of tube axis Z of the main body 2. A surface of each deformation controlling portion 4 which is in contact with the deformable portion 3 is the slope surface 4a which extends in the radially outward directions of the main body 2 with an inclination to one side or the other side with respect to the direction of tube axis Z. Any two slope surfaces 4a which are adjacent in the direction of tube axis Z extend in the radially outward directions of the main body 2 with an inclination to opposite sides such that, when a compression load equal to or greater than the predetermined value is input to the main body 2 in the direction of tube axis Z, the deformable portions 3 undergo plastic deformation in the radially inward directions of the main body 2 concurrently with compressive plastic deformation in the direction of tube axis Z. The shear deformation enhancing layers 9 are provided at the borders between the slope surfaces 4a and the deformable portions 3 for enhancing shear deformation of the end parts of the deformable portions 3 near the borders relative to the slope surfaces 4a when a compression load equal to or greater than the predetermined value is input to the main body 2 in the direction of tube axis Z. Due to this configuration, the deformable portions 3 expand in the radially inward directions of the main body 2 while the dimension in the direction of tube axis Z decreases. Thus, the entire main body 2 stably deforms in the direction of tube axis Z without causing buckling deformation. Since the shear deformation enhancing layers 9 are provided at the borders between the slope surfaces 4a and the deformable portions 3, the deformable portions 3 more readily undergo plastic deformation in the radially inward directions of the main body 2 due to the shear deformation enhancing layers 9. As a result, even when a force which could push down the main body 2 in a radial direction is input to the main body 2 concurrently with a compression load input in the direction of tube axis Z, the main body 2 is less susceptible to buckling deformation and surely deforms in the direction of tube axis Z, so that the absorbability for the compression load can be improved. Since the deformation resistance against plastic deformation of the deformable portions 3 in the radially inward directions of the main body 2 is larger than the deformation resistance against plastic deformation in the radially outward directions, the amount of absorbed compression load can be further increased. Even when the deformable portions 3 and the deformation controlling portions 4 are increased in number, the deformable portions 3 and the deformation controlling portions 4 can be firmly and readily combined together by integral molding. Thus, the handleability of the impact energy absorber 1 during transportation or assemblage into the vehicle 100 can be improved.

Example Embodiment 6

In this example embodiment, the materials of the deformation controlling portions 4 and the shear deformation enhancing layers 9 are different from those used in example embodiment 5, while the other elements are the same as those of example embodiment 5.

Specifically, in this example embodiment, the deformation controlling portions 4 are made of a metal material which is less susceptible to compressive plastic deformation and fracture than a aluminum alloy casting against a compression load input in the direction of tube axis Z (in this example embodiment, steel member). The shear deformation enhancing layers 9 are made of an alloy which contains a metal used for the deformable portions 3 (aluminum alloy) and which has a lower melting point than the metal of the deformable portions 3 (in this example embodiment, Zn—Al alloy). The shear deformation enhancing layers 9 composed of the Zn—Al alloy have a low strength. Therefore, due to the shear force which occurs when a compression load equal to or greater than a predetermined value is input to the main body 2, the end parts of the deformable portions 3 near the borders readily undergo shear deformation in the radially inward directions of the main body 2 relative to the slope surfaces 4a. As a result, the deformable portions 3 more readily undergo plastic deformation in the radially inward directions of the main body 2.

To fabricate the impact energy absorber 1 of this example embodiment, a plurality of deformation controlling portion formation members are first prepared for formation of the plurality of deformation controlling portions 4. Specifically, steel members are processed so as to have the same shape as the deformation controlling portions 4. Then, the steel members are subjected to zinc plating over at least opposite surfaces of the steel members with respect to a direction corresponding to the direction of tube axis Z in order that end parts of the steel members (deformation controlling portion formation members) corresponding to the slope surfaces 4a are composed of a plating material which has a lower melting point than the metal of the deformable portions 3. Note that zinc alloy plating (for example, Zn—Al, Zn—Al—Mg, or Sn—Zn) may be employed instead of zing plating.

Then, a plurality of through-holes are formed in the zinc-plated steel members so as to extend in a direction corresponding to the direction of tube axis Z. Thus, preparation of the deformation controlling portion formation members is completed. Note that zinc plating may be carried out after formation of the through-holes.

The through-holes are provided to ensure that the molten material flows in the direction of tube axis Z within the cavity 35 of the casting mold 30 described in example embodiment 1 and that the deformable portions 3 and the deformation controlling portions 4 are securely integrated. However, when the number of through-holes is excessively increased, the shear deformation enhancing property of the shear deformation enhancing layers 9 can deteriorate. These circumstances need to be considered in determining the number of through-holes.

Note that formation of the through-holes is not indispensable. When through-holes are not formed, circulation trenches through which the molten material can flow may be formed in the fixed mold 32 in order that the molten material flows in the direction of tube axis Z within the cavity 35.

Ridges which are formed in accordance with the circulation trenches may be removed after casting.

The prepared deformation controlling portion formation members are set in the cavity 35 of the casting mold 30 as are the premolded bodies 18 of example embodiment 5, and the molten aluminum alloy is supplied into the cavity 35, whereby the deformable portions 3, the deformation controlling portions 4 (deformation controlling portion formation members), and the first and second fixing portions 7 and 8 are integrally molded. Since the deformation controlling portion formation members have the through-holes, the molten alloy flows through the through-holes in the direction of tube axis Z within the cavity 35, and the deformable portions 3 and the deformation controlling portions 4 are securely integrated via the through-holes.

In the above integral molding, plated zinc melts due to the molten alloy so that the shear deformation enhancing layers 9 of a Zn—Al alloy which has a lower melting point than the aluminum alloy are formed at the borders between the slope surfaces 4a and the deformable portions 3.

Thus, this example embodiment also provides the same advantages as those of example embodiment 5. When a compression load equal to or greater than the predetermined value is input to the main body 2 in the direction of tube axis Z, the main body 2 surely deforms in the direction of tube axis Z so that the absorbability for the compression load can be improved.

Example Embodiment 7

In this example embodiment, the material of the deformation controlling portions 4 is the same as that used in example embodiment 6, and the material of the shear deformation enhancing layers 9 is different from that used in example embodiments 5 and 6. The other elements are the same as those of example embodiments 5 and 6.

Specifically, in this example embodiment, the steel members of example embodiment 6 are used as the deformation controlling portion formation members without plating. Provided that through-holes are formed as in example embodiment 6 (as described in example embodiment 6, formation of the through-holes is not necessary when the circulation trenches through which the molten material can flow are formed in the fixed mold 32).

The deformation controlling portion formation members are set in the cavity 35 of the casting mold 30 as in example embodiment 6, and the molten aluminum alloy is supplied into the cavity 35, whereby the deformable portions 3, the deformation controlling portions 4 (deformation controlling portion formation members), and the first and second fixing portions 7 and 8 are integrally molded.

After solidification of the molten alloy, the integrally-molded structure is thermally treated so that the shear deformation enhancing layers 9 of an Al—Fe intermetallic compound are formed. Specifically, the thermal treatment is carried out, for example, at 400° C. for about one hour so that the Al—Fe intermetallic compound is formed at the borders between the deformable portions 3 (aluminum alloy) and the deformation controlling portions 4 (steel). The shear deformation enhancing layers 9 of the Al—Fe intermetallic compound have low strength and are brittle. Therefore, due to the shear force which occurs when a compression load equal to or greater than a predetermined value is input to the main body 2, the end parts of the deformable portions 3 near the borders readily undergo shear deformation in the radially inward directions of the main body 2 relative to the slope surfaces 4a.

Thus, this example embodiment also provides the same advantages as those of example embodiments 5 and 6. When a compression load equal to or greater than the predetermined value is input to the main body 2 in the direction of tube axis Z, the main body 2 surely deforms in the direction of tube axis Z so that the absorbability for the compression load can be improved.

What is claimed is:

1. An impact energy absorber comprising:
   a tubular main body for absorbing a compression load input to the main body in a tube axis direction, wherein
   the main body includes
      a deformable portion which is composed of a metal and which is adapted to undergo compressive plastic deformation in the tube axis direction when the compression load is equal to or greater than a predetermined value, and
      a plurality of deformation controlling portions which are placed at a plurality of positions along the tube axis direction in an annular arrangement along a perimeter direction of the main body and which are adapted to control a direction of the plastic deformation of the deformable portion, the deformable portion and the deformation controlling portions being integrally molded, and
   the deformation controlling portions have such a configuration and shape that, when the compression load input to the main body is equal to or greater than the predetermined value, the deformable portion undergoes plastic deformation in at least one of a radially outward direction and a radially inward direction of the main body concurrently with the compressive plastic deformation in the tube axis direction of the main body.

2. The impact energy absorber of claim 1, wherein
   the deformable portion and the deformation controlling portions are alternately stacked in the tube axis direction of the main body, and
   a surface of each of the deformation controlling portions which is in contact with the deformable portion is a slope surface which extends in the radially outward direction of the main body with an inclination to one side or the other side with respect to the tube axis direction of the main body.

3. The impact energy absorber of claim 2, wherein any two of the slope surfaces which are adjacent in the tube axis direction of the main body extend in the radially outward direction of the main body with an inclination to opposite sides.

4. The impact energy absorber of claim 3, wherein the slope surfaces are inclined such that, when the compression load input to the main body is equal to or greater than the predetermined value, the deformable portion undergoes plastic deformation in the radially inward direction of the main body concurrently with the compressive plastic deformation in the tube axis direction of the main body.

5. The impact energy absorber of claim 1, wherein
   the deformable portion is composed of an aluminum alloy casting, and
   the deformation controlling portions are composed of an aluminum alloy casting which contains reinforcement fiber.

6. The impact energy absorber of claim 5, wherein the aluminum alloy casting is an Al—Mn—Fe—Mg alloy casting.

7. The impact energy absorber of claim 1, wherein the impact energy absorber is used for a front side frame or a crush can of a vehicle.

8. The impact energy absorber of claim 3, further comprising a shear deformation enhancing layer at a border between the slope surface and the deformable portion for enhancing shear deformation of an end part of the deformable portion near the border relative to the slope surface when the compression load input to the main body is equal to or greater than the predetermined value.

9. The impact energy absorber of claim 8, wherein the slope surfaces are inclined such that, when the compression load input to the main body is equal to or greater than the predetermined value, the deformable portion undergoes plastic deformation in the radially inward direction of the main body concurrently with the compressive plastic deformation in the tube axis direction of the main body.

10. The impact energy absorber of claim 8, wherein the shear deformation enhancing layer is composed of an alloy which contains the metal and which has a lower melting point than the metal.

11. The impact energy absorber of claim 8, wherein
the deformable portion is composed of an aluminum alloy casting,
the deformation controlling portions and the shear deformation enhancing layer are composed of an aluminum alloy casting which contains reinforcement fiber, and
a reinforcement fiber volume fraction in the shear deformation enhancing layer is larger than that in the deformation controlling portions.

12. The impact energy absorber of claim 8, wherein
the deformable portion is composed of an aluminum alloy casting,
the deformation controlling portions are composed of steel members, and
the shear deformation enhancing layer is composed of an Al—Fe intermetallic compound.

13. The impact energy absorber of claim 11, wherein the aluminum alloy casting is an Al—Mn—Fe—Mg alloy casting.

14. The impact energy absorber of claim 12, wherein the aluminum alloy casting is an Al—Mn—Fe—Mg alloy casting.

15. The impact energy absorber of claim 8, wherein the impact energy absorber is used for a front side frame or a crush can of a vehicle.

* * * * *